US010679122B2

(12) United States Patent
Park et al.

(10) Patent No.: US 10,679,122 B2
(45) Date of Patent: Jun. 9, 2020

(54) NEUROMORPHIC DEVICE

(71) Applicant: SK hynix Inc., Icheon (KR)

(72) Inventors: Sang-Su Park, Icheon (KR); Hyung-Dong Lee, Icheon (KR)

(73) Assignee: SK hynix Inc., Icheon (KR)

( * ) Notice: Subject to any disclaimer, the term of this patent is extended or adjusted under 35 U.S.C. 154(b) by 833 days.

(21) Appl. No.: 15/394,524

(22) Filed: Dec. 29, 2016

(65) Prior Publication Data

US 2017/0193359 A1    Jul. 6, 2017

Related U.S. Application Data

(60) Provisional application No. 62/273,255, filed on Dec. 30, 2015.

(30) Foreign Application Priority Data

Dec. 6, 2016 (KR) .................. 10-2016-0164970

(51) Int. Cl.
*H01L 29/788* (2006.01)
*G06N 3/063* (2006.01)
*G06N 3/04* (2006.01)

(52) U.S. Cl.
CPC .......... *G06N 3/0635* (2013.01); *G06N 3/049* (2013.01)

(58) Field of Classification Search
None
See application file for complete search history.

(56) References Cited

U.S. PATENT DOCUMENTS 5,583,360 A      12/1996  Roth et al.
9,117,513 B2 *    8/2015  Hwang .............. G11C 13/0002
9,269,901 B2 *    2/2016  Hwang .................. H01L 45/145
9,627,443 B2 *    4/2017  Jo ........................ G11C 13/0007
10,270,029 B2 *   4/2019  Ando ................... H01L 45/146
2016/0268418 A1 * 9/2016  Lee ........................ H01L 45/085

FOREIGN PATENT DOCUMENTS

KR    10-2013-0087233 A    8/2013

OTHER PUBLICATIONS

Bin Gao et al., "Ultra-Low-Energy Three-Dimensional Oxide-Based Electronics Synapses for Implementation of Robust High-Accuracy Neuromorphic Computation Systems", ACS Nano, Jun. 2014, pp. 6998-7004, vol. 8, Issue No. 7, American Chemical Society.

* cited by examiner

*Primary Examiner* — Ali Naraghi

(57) ABSTRACT

A neuromorphic device includes a substrate; a first electrode and a second electrode that are disposed over the substrate, extend in a first direction, and are spaced apart in a second direction; a stack structure between the first electrode and the second electrode, which includes reactive metal layers alternately stacked with one or more insulating layers; an oxygen-containing layer between the first electrode and the stack structure, which includes oxygen ions; and an oxygen diffusion-retarding layer between the stack structure and the oxygen-containing layer. The first direction is perpendicular to a top surface of the substrate, and the second direction is parallel to the top surface of the substrate. Each reactive metal layer may react with the oxygen ions to form a dielectric oxide layer. The oxygen diffusion-retarding layer interferes with a movement of the oxygen ions. A thickness of the oxygen diffusion-retarding layer varies along the first direction.

20 Claims, 14 Drawing Sheets

NEUROMORPHIC DEVICE

CROSS-REFERENCE TO RELATED APPLICATIONS

The present application claims priority to U.S. Provisional Patent Application No. 62/273,255, filed on Dec. 30, 2015, and Korean Patent Application No. 10-2016-0164970, filed on Dec. 6, 2016, which are incorporated herein by reference in their entirety.

BACKGROUND

1. Field

Exemplary embodiments of the present disclosure relate to neuromorphic devices that mimic a human nervous system, and their applications.

2. Description of the Related Art

Recently, as electronic appliances trend toward miniaturization, low power consumption, high performance, multi-functionality, and so on, technology capable of efficiently processing large-volume information has been demanded. In particular, neuromorphic technology for mimicking neurobiological architectures present in a human nervous system has received much attention to implement the technology of efficiently processing large-volume information. The human nervous system includes several thousand billions of neurons and synapses serving as junctions between the respective neurons. In the neuromorphic technology, neuron circuits and synapse circuits, which correspond to neurons and synapses of the human nervous system, respectively, are designed to realize neuromorphic devices. The neuromorphic devices may be used in various applications including data classification, pattern recognition, and the like.

SUMMARY

Embodiments of the present disclosure are directed to neuromorphic device including a synapse having enhanced symmetry and linearity.

In accordance with an embodiment, a neuromorphic device includes: a substrate; a first electrode and a second electrode that are disposed over the substrate, the first and second electrodes extending in a first direction and being spaced apart from each other in a second direction, the first direction being perpendicular to a top surface of the substrate, the second direction being parallel to the top surface of the substrate; a stack structure disposed between the first electrode and the second electrode, the stack structure including a plurality of reactive metal layers which are alternately stacked with one or more insulating layers, wherein each of the reactive metal layers is capable of reacting with oxygen ions to form a dielectric oxide layer; an oxygen-containing layer disposed between the first electrode and the stack structure, the oxygen-containing layer including the oxygen ions; and an oxygen diffusion-retarding layer disposed between the stack structure and the oxygen-containing layer, the oxygen diffusion-retarding layer interfering with a movement of the oxygen ions from the oxygen-containing layer to the reactive metal layers, and wherein a thickness of the oxygen diffusion-retarding layer varies along the first direction.

In the above embodiment, the thickness of the oxygen diffusion-retarding layer increases from a top of the oxygen diffusion-retarding layer to a bottom of the oxygen diffusion-retarding layer. The thickness of the oxygen diffusion-retarding layer decreases from a top of the oxygen diffusion-retarding layer to a bottom of the oxygen diffusion-retarding layer. The second electrode includes a plurality of second electrodes, which are spaced apart from each other, and wherein the stack structure includes a plurality of stack structures, which are spaced apart from each other, each of the plurality of stack structures corresponding to a respective one of the plurality of second electrodes. The neuromorphic device further comprises: an interlayer insulating layer disposed between two adjacent second electrodes and between two adjacent stack structures corresponding to the two adjacent second electrodes. The neuromorphic device further comprises: a slit penetrating through the interlayer insulating layer and extending in a direction crossing a region between the two adjacent second electrodes and between the two adjacent stack structures, the slit extending from the first electrode. The neuromorphic device further comprises: a filling layer disposed in the slit, the filling layer including the same material as at least one of the oxygen-containing layer and the oxygen diffusion-retarding layer. Thicknesses of the plurality of reactive metal layers are different from each other. Thicknesses of the plurality of reactive metal layers increase along a direction from a top of the stack structure to a bottom of the stack structure. Thicknesses of the reactive metal layers decrease along a direction from a top of the stack structure to a bottom of the stack structure. The oxygen-containing layer is disposed against a side surface of the first electrode, the oxygen-containing layer encircling the first electrode. The oxygen diffusion-retarding layer is disposed against a side surface of the oxygen-containing layer, the oxygen diffusion-retarding layer encircling the oxygen-containing layer. A reset operation is performed when a reset voltage having a first polarity is applied through the first electrode and the second electrode, the reset operation including forming or thickening the dielectric oxide layer in at least one of the plurality of reactive metal layers at an interface with the oxygen diffusion-retarding layer, and wherein a set operation is performed when a set voltage having a second polarity opposite to the first polarity is applied through the first electrode and the second electrode, the set operation including disappearing or thinning the dielectric oxide layer. The dielectric oxide layer is formed the fastest in a first reactive metal layer of the plurality of reactive metal layers, the first reactive metal layer being separated from the oxygen-containing layer by a thinnest region of the oxygen diffusion-retarding layer. Thicknesses of the plurality of reactive metal layers are different from each other, and the dielectric oxide layer is formed the fastest in a first reactive metal layer of the plurality of reactive metal layers, the first reactive metal layer having the smallest thickness of the plurality of reactive metal layers. The dielectric oxide layer includes one or more dielectric oxide layers, and wherein an electrical conductivity decreases as a number of the one or more dielectric oxide layers increases or a thickness of each the one or more dielectric oxide layers increases, and the electrical conductivity increases as the number of the one or more dielectric oxide layers decreases or the thickness of each of the one or more dielectric oxide layers decreases. The dielectric oxide layer includes one or more dielectric oxide layers, and wherein, during the reset operation, a number of the one or more dielectric oxide layers increases or a thickness of each of the one or more dielectric oxide layers increases when a number of pulses of the reset voltage applied through the first electrode and the second electrode increases, and wherein, during the set operation, the number of the one or more dielectric oxide layers decreases or a thickness of each of the one or more dielectric oxide layers decreases when a number of pulses of the set voltage applied through the first electrode and the second electrode increases. During the reset operation, the pulses of the reset voltage have a constant width and magnitude, and wherein, during the set operation, the pulses of the set voltage have a constant width and magnitude. The oxygen diffusion-retarding layer has a thickness that incompletely blocks the movement of the oxygen ions. The oxygen diffusion-retarding layer comprises a dielectric material, a semiconductor material, or a combination of the dielectric material and the semiconductor material.

DETAILED DESCRIPTION

Figure 1:
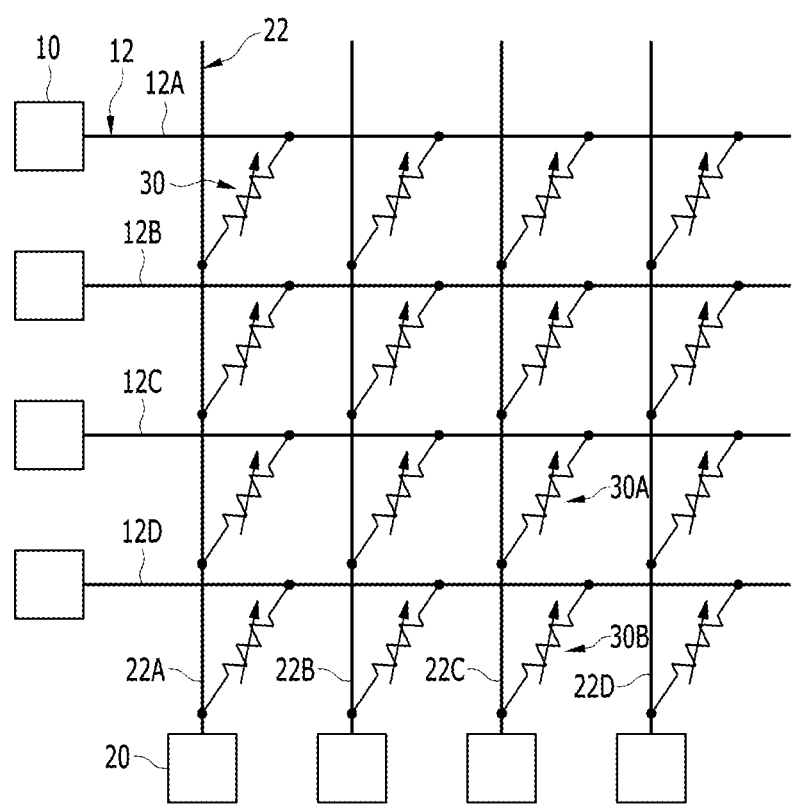
FIG. 1 illustrates a neuromorphic device according to an embodiment.

Various examples and implementations of the disclosed technology are described below in detail with reference to the accompanying drawings.

The drawings may not be necessarily to scale and in some instances, proportions of at least some of structures in the drawings may have been exaggerated in order to clearly illustrate certain features of the described examples or implementations. In presenting a specific example in a drawing or description having two or more layers in a multi-layer structure, the relative positioning relationship of such layers or the sequence of arranging the layers as shown reflects a particular implementation for the described or illustrated example and a different relative positioning relationship or sequence of arranging the layers may be possible. In addition, a described or illustrated example of a multi-layer structure may not reflect all layers present in that particular multilayer structure (e.g., one or more additional layers may be present between two illustrated layers). As a specific example, when a first layer in a described or illustrated multi-layer structure is referred to as being "on" or "over" a second layer or "on" or "over" a substrate, the first layer may be directly formed on the second layer or the substrate but may also represent a structure where one or more other intermediate layers may exist between the first layer and the second layer or the substrate.

FIG. 1 illustrates a neuromorphic device according to an embodiment.

Referring to FIG. 1, the neuromorphic device according to the embodiment may include a plurality of pre-synaptic neurons 10, a plurality of post-synaptic neurons 20, and a plurality of synapses 30 that provide connections between the plurality of pre-synaptic neurons 10 and the plurality of post-synaptic neurons 20.

For illustrative convenience, the neuromorphic device of the embodiment shown in FIG. 1 includes four pre-synaptic neurons 10, four post-synaptic neurons 20, and sixteen synapses 30, but the numbers of pre-synaptic neurons, post-synaptic neurons, and synapses in the neuromorphic device may be changed in various ways. If the number of pre-synaptic neurons 10 is N and the number of post-synaptic neurons 20 is M, N*M synapses 30 may be arranged in a matrix form, wherein N and M are natural numbers equal to or greater than 2, and N and M may or may not be equal to each other.

For this arrangement shown in FIG. 1, the neuromorphic device may further include a plurality of first lines 12 and a plurality of second lines 22. The plurality of first lines 12 may be coupled to the plurality of pre-synaptic neurons 10, respectively, and may extend in a first direction, for example, a horizontal direction with respect to the orientation of FIG. 1. The plurality of second lines 22 may be coupled to the plurality of post-synaptic neurons 20, respectively, and may extend in a second direction crossing the first direction, for example, a vertical direction with respect to the orientation of FIG. 1. Hereinafter, for convenience of explanation, the first lines 12 will be referred to as row lines, and the second lines 22 will be referred to as column lines. The plurality of synapses 30 may be disposed at intersections between the row lines 12 and the column lines 22. Each of the synapses 30 may couple a corresponding one of the row lines 12 to a corresponding one of the column lines 22. In other words, the plurality of synapses 30 may be disposed in regions where the row lines 12 overlap with the column lines 22. That is, each of the synapses 30 may be disposed in an intersection region between the corresponding row line 15 and the corresponding column line 25.

The pre-synaptic neurons 10 may generate a signal (e.g., a signal corresponding to certain data) and transmit the generated signal to the row lines 12. The post-synaptic neurons 20 may receive, through the column lines 22, a synaptic signal corresponding to the signal that was generated by the pre-synaptic neurons 10 and has passed through the synapses 30, and may process the received signal.

The row lines 12 may correspond to axons of the pre-synaptic neurons 10, and the column lines 22 may correspond to dendrites of the post-synaptic neurons 20. However, whether a neuron of interest is a pre-synaptic neuron or a post-synaptic neuron may be determined by its relationship with another neuron. For example, a neuron receiving a synaptic signal from another neuron may function as a post-synaptic neuron. Similarly, a neuron transmitting a signal to another neuron may function as a pre-synaptic neuron. The pre-synaptic neurons 10 and the post-synaptic neurons 20 may be implemented using various circuits such as complementary metal-oxide-semiconductor (CMOS) circuits.

The pre-synaptic neurons 10 and the post-synaptic neurons 20 are electrically coupled by the synapses 30. Herein, the synapse 30 is an element that has an electrical conductance or a weight changing according to an electrical pulse (e.g., a voltage or current) applied to the synapse 30.

Each of the synapses 30 may include a variable resistance element. The variable resistance element is an element capable of switching between different resistance states according to a voltage or current that is applied to both ends thereof. The variable resistance element may have a single-layered structure, or may have a multi-layered structure that includes any of various materials. The single-layered structure may have a plurality of resistance states by itself. The multi-layered structure may have a plurality of resistance states by combinations of the various materials. The various materials may include any of metal oxides such as transition metal oxides or perovskite-based materials, phase-change materials such as chalcogenide-based materials, ferroelectric materials, ferromagnetic materials, and the like.

An operation in which the variable resistance element of the synapse 30 switches from a high-resistance state to a low-resistance state may be referred to as a set operation, and an operation in which the variable resistance element of the synapse 30 switches from the low-resistance state to the high-resistance state may be referred to as a reset operation.

However, unlike variable resistance elements that are used in memory devices such as RRAM, PRAM, FRAM, and MRAM devices, a resistance value of the synapse 30 in the neuromorphic device does not change abruptly in the set operation and the reset operation. Instead, the synapse 30 exhibits an analog behavior in which electrical conductivity of the synapse 30 gradually changes according to the number and/or magnitude of electrical pulses applied to the synapse 30 during the set operation and the reset operation. Thus, the synapse 30 may have various characteristics distinguishable from those of a variable resistance element of another type of memory device, because the characteristics of the synapse 30 in the neuromorphic device differ from characteristics required for a variable resistance element of another type of memory device.

On the other hand, another type of memory device preferably uses a variable resistance element that maintain its electrical conductivity before a set operation or a reset operation is performed, even if electrical pulses are repeatedly applied to the variable resistance element. Accordingly, the variable resistance element may store different data by having clearly distinguished low-resistance and high-resistance states.

Meanwhile, an example of a learning operation of the neuromorphic device of FIG. 1 will be described. For convenience of explanation, the four row lines 12 may be sequentially referred to as a first row line 12A, a second row line 12B, a third row line 12C, and a fourth row line 12D, as illustrated from the top to the bottom of FIG. 1. The four column lines 22 may be sequentially referred to as a first column line 22A, a second column line 22B, a third column line 22C, and a fourth column line 22D, as illustrated from the left to the right of FIG. 1.

Each of the synapses 30 may undergo a set operation by switching from a high-resistance state to a low-resistance state, and may undergo a reset operation by switching from a low-resistance state to a high-resistance state. An electrical conductivity of each of the synapses 30 increases during a potentiation operation, and decreases during a depression operation.

In an initial stage of the learning operation, each of the synapses 30 may be in a high-resistance state. If at least one of the synapses 30 is in a low-resistance state, an initialization operation for changing the low-resistance state of the synapses 30 to the high-resistance state may be performed in order to bring the synapses 30 to the initial stage.

Each of the synapses 30 may have a certain critical value. More specifically, if a voltage or current lower than the certain critical value is applied to the synapse 30, the electrical conductivity of the synapse 30 may not change, and if a voltage or current equal to or higher than the certain critical value is applied to the synapse 30, the electrical conductivity of the synapse 30 may change.

In the initial stage, in order to perform an operation for learning certain data in any column line 22, an input signal corresponding to the certain data may be input to the row lines 12 so that an electrical pulse is selectively applied to each of the row lines 12 according to the certain data. The input signal may be input by applying electrical pulses to row lines 12 corresponding to '1' in the certain data, and not to row lines 12 corresponding to '0' in the certain data. For example, if an input signal corresponding to certain data '0011' is input to the row lines 12 of FIG. 1, an electrical pulse may not be applied to the first and second row lines 12A and 12B, and may be applied to the third and fourth row lines 12C and 12D.

While the input signal is being input, the column lines 22 may be selectively driven at a suitable voltage or current for the learning operation.

As an example, if a column line 22 to learn specific data is predetermined, the predetermined column line 22 may be driven such that synapses 30 located at intersections between the row lines 12 corresponding to '1' and the predetermined column 22 may receive a voltage equal to or higher than a set voltage. The set voltage may be a voltage required for the set operation. Simultaneously, the remaining column lines 22, which are not the predetermined column line 22, may be driven such that the remaining synapses 30 may receive a voltage lower than the set voltage. Referring to FIG. 1, the remaining synapses are synapses other than the synapses 30 located at the intersections between the row lines 12 corresponding to '1' and the predetermined column lines 22.

For example, if the magnitude of the set voltage is Vset and the third column line 22C is predetermined as a column line to learn the certain data '0011,' the magnitude of the electrical pulse that is applied to each of the third and fourth row lines 12C and 12D may be equal to or higher than Vset, and a voltage that is applied to the third column line 22C may be 0 V, such that first and second synapses 30A and 30B located at intersections between the third column line 22C and the third and fourth row lines 12C and 12D receive a voltage equal to or higher than Vset. Thus, the first and second synapses 30A and 30B may switch from the high-resistance state to a low-resistance state. That is, each of the first and second synapses 30A and 30B may undergo the set operation.

The electrical conductivity of the first and second synapses 30A and 30B in the low-resistance state may gradually increase as the number of electrical pulses applied to the first and second synapses 30A and 30B increases. That is, each of the first and second synapses 30A and 30B may undergo a potentiation operation.

On the other hand, a voltage applied to the remaining column lines 22, that is, to the first, second, and fourth column lines 22A, 22B, and 22D, may have a magnitude between 0V and Vset such that the remaining synapses 30 receive a lower voltage than Vset. For example, the voltage applied to the remaining column lines 22 may be equal to ½ Vset. Thus, resistance states of the remaining synapses 30, which are synapses 30 other than the first and second synapses 30A and 30B, may not change.

If the row lines 12 and the column lines 22 are driven in the above-described manner, the electrical conductivity of synapses 30 that receive electrical pulses may gradually increase, and thus a current flowing through the synapses 30 that receive the electrical pulses may increase. For example, the electrical conductivity of the synapses 30A and 30B may increase when the synapses 30A and 30B receive the electrical pulses from the third and fourth row lines 12C and 12D, and a current flowing to the third column line 22C through the synapses 30A and 30B may increase. When the current flowing to the third column line 22C is measured and the measured current reaches a certain critical current, the third column line 22C may be a 'column line that has leaned specific data,' for example, a column line that has learned the certain data '0011.'

As another example, a column line 22 to learn specific data may not be predetermined. In this case, a current flowing to each of the column lines 22 is measured while electrical pulses corresponding to the specific data are applied to the row lines 12. Based on the measurement results, a column line, e.g., the first column line 22A, which reached the certain critical current before the other column lines, e.g., the second to fourth column lines 22B to 22D, may be determined to be a column line that has learned the specific data.

In the above-described manner, the other column lines may learn different data in other learning operations.

Meanwhile, although the learning operation described above includes only the set operation of changing the resistance state of the synapses 30 from a high-resistance state to a low-resistance state and the potentiation operation of increasing the electrical conductivity of the synapses 30, the learning operation may also include the reset operation of changing the resistance state of the synapses 30 from the low-resistance state to the high-resistance state and the depression operation for reducing the electrical conductivity of the synapses 30.

For example, the polarity of pulses that are applied in the set operation of the synapses 30 and the potentiation operation of increasing the electrical conductivity of the synapses 30 may be opposite to the polarity of pulses that are applied in the reset operation of the synapses 30 and the depression operation of reducing the electrical conductivity of the synapses 30.

Hereinafter, characteristics of a synapse suitable for a neuromorphic device will be described in detail with reference to FIGS. 2A to 2D.

FIGS. 2A to 2D illustrate characteristics associated with each of the synapses 30 shown in FIG. 1.

Figure 2A:
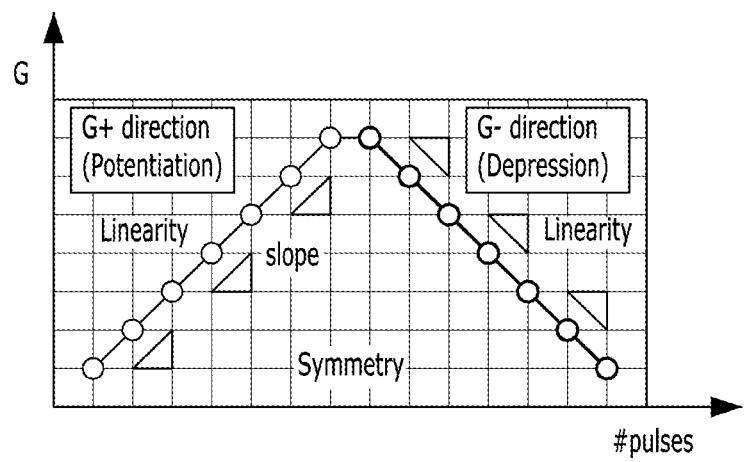
FIGS. 2A to 2D illustrate characteristics of a synapse of the neuromorphic device shown in FIG. 1.
Figure 2B:
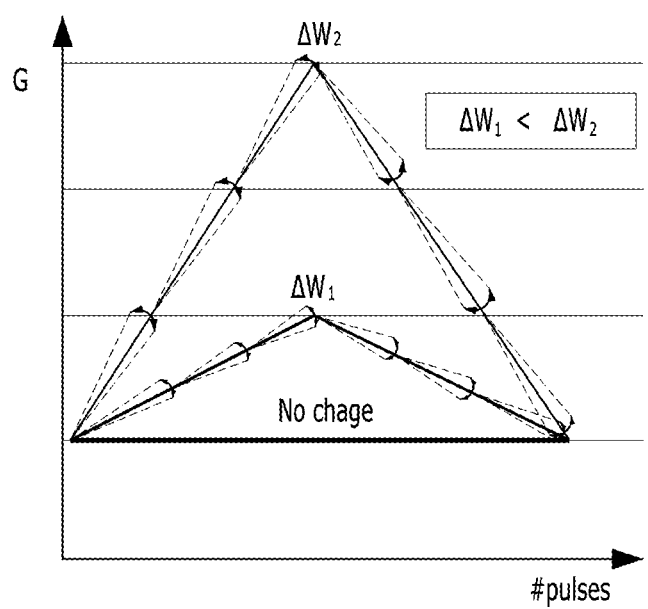
Figure 2C:
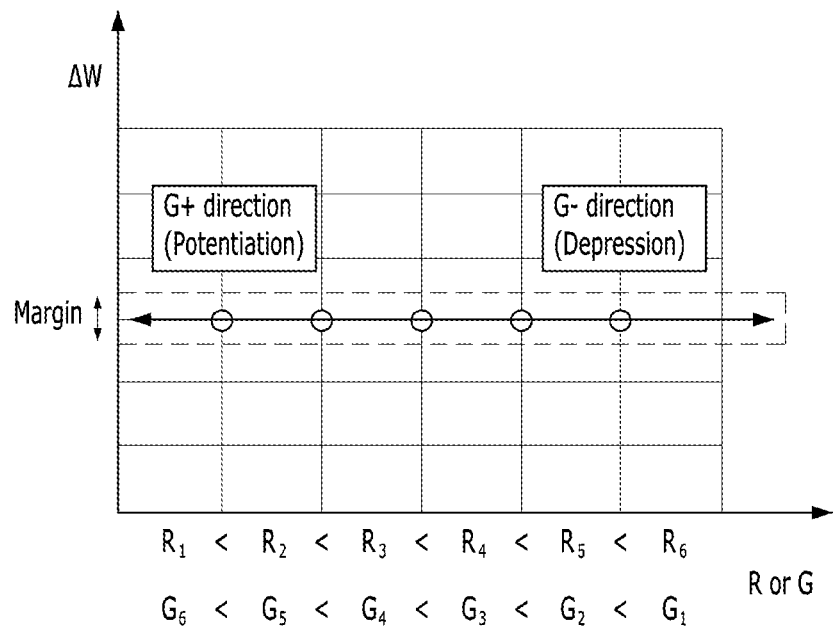
Figure 2D:
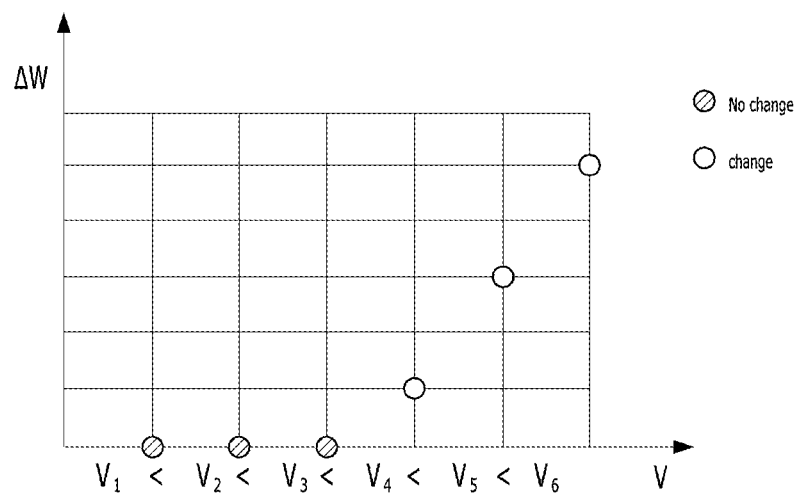

Specifically, FIGS. 2A and 2B illustrate the electrical conductivity G of a synapse 30 according to the number of electrical pulses that are applied to the synapse 30. FIG. 2C shows a change in weight ΔW of the synapse 30 with a change in a resistance value R or electrical conductivity G of the synapse 30. FIG. 2D shows the change in weight ΔW of the synapse 30 according to a magnitude of a voltage V that is applied to the synapse 30.

Referring to FIGS. 2A and 2B, if first-polarity voltage pulses (e.g., negative voltage pulses) with a voltage higher than a certain critical value are repeatedly applied to the synapse 30 that is in a low-resistance state, the electrical conductivity G of the synapse 30 may gradually increase. A direction in which the electrical conductivity G of the synapse 30 increases may be referred to as a G+ direction or a potentiation direction.

If second-polarity voltage pulses (e.g., positive voltage pulse) with a voltage equal to or higher than the reset voltage are applied to the synapse 30, the reset operation may be performed, such that the resistance state of the synapse 30 changes to a high-resistance state.

If second-polarity voltage pulses are repeatedly applied to the synapse 30 when the synapse 30 is in the high-resistance state, the electrical conductivity G of the synapse 30 may gradually decrease. A direction in which the electrical conductivity G of the synapse 30 decreases may be referred to as a G− direction or a depression direction.

If first-polarity voltage pulses with a voltage equal to or higher than the set voltage are applied again to this synapse 30, the set operation may be performed so that the resistance state of the synapse 30 changes again to the low-resistance state.

Herein, it is preferable that, if the magnitude and width of pluses are constant, a change in the electrical conductivity G of the synapse 30 in the potentiation operation be substantially symmetric with a change in the electrical conductivity G of the synapse 30 in the depression operation, and a rate of change in the electrical conductivity G is substantially constant in each of the potentiation operation and the depression operation. In other words, it is preferable that the electrical conductivity G of the synapse 30 has linearity and symmetry in the potentiation operation and the depression operation, such that a resistance value of the synapse 30 does not abruptly change in the set operation or the reset operation. If the magnitude and/or width of the pulses must be varied to secure the linearity and symmetry of the synapse 30, it may be necessary to implement additional circuits in the neuromorphic device to generate various pulses. The addition of additional circuits may be disadvantageous in terms of area or power. Therefore, it is preferable to control the pulses to have the constant magnitude and width while driving the synapse 30.

The linearity and symmetry of the electrical conductivity G of the synapse 30 in the potentiation operation and the depression operation may be observed in both the case in which a rate of change in the weight of the synapse 30 is small (see ΔW1 in FIG. 2B) and the case in which the rate of change in the weight of the synapse 30 is great (see ΔW2 in FIG. 2B). However, if the magnitude or width of pulses is not sufficiently large, the electrical conductivity G of the synapse 30 may not change regardless of the number of the pulses being applied to the synapse 30.

Referring to FIG. 2C, it is preferable that the rate of change in the weight ΔW of the synapse 30 be substantially constant regardless of a present state of the synapse 30, that is, the present resistance value R or present electrical conductivity G of the synapse 30.

Referring to FIG. 2D, when a voltage equal to or lower than a certain critical value is applied, for example, $V_3$, the weight W and/or electrical conductivity G of the synapse 30 may not change. Namely, the rate of change in the weight ΔW of the synapse 30 may be 0. On the other hand, at a voltage higher than the certain critical value $V_3$, for example, a voltage equal to or higher than $V_4$, the rate of change in the weight ΔW of the synapse 30 may increase. Herein, the rate of change in the weight ΔW of the synapse 30 may increase substantially in proportion to the magnitude of the voltage applied to the synapse 30.

In summary, it is preferable that the electrical conductivity G of the synapse 30 of the neuromorphic device increase or decrease substantially in proportion to the number of electrical pulses being applied to the synapse 30, regardless of the present state of the synapse 30. It is also preferable that a change in the electrical conductivity G of the synapse 30 in the potentiation operation be symmetric with a change in the electrical conductivity G of the synapse 30 in the depression operation. Herein, it is preferable that the change in the electrical conductivity G of the synapse 30 occur only at a voltage equal to or higher than the certain critical value. As the characteristics of the synapse 30 are closer to the above-described characteristics, the learning and recognition accuracy of the neuromorphic device may increase, and thus operating characteristics of the neuromorphic device may be improved.

Embodiments of the present disclosure are directed to a synapse capable of satisfying the above-described characteristics shown in FIGS. 2A to 2D to the maximum possible extent. Prior to the description of the embodiments, a synapse of a comparative example will be described.

Figure 3A:
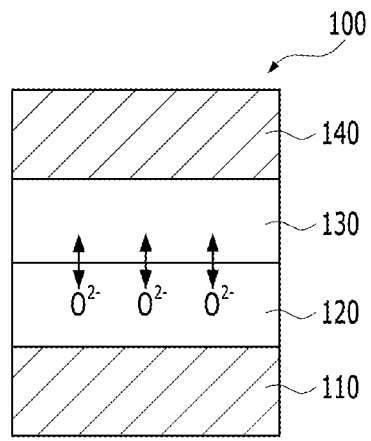
FIG. 3A is a cross-sectional view illustrating a synapse of a comparative example.
Figure 3B:
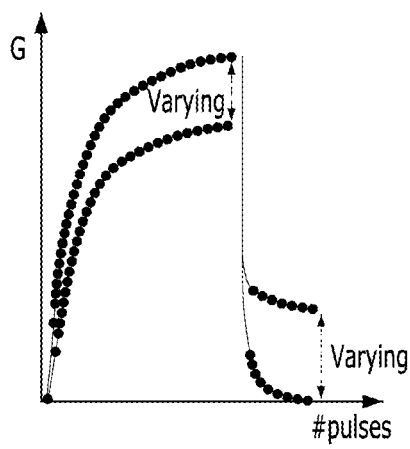
FIGS. 3B and 3C illustrate characteristics of the synapse shown in FIG. 3A.
Figure 3C:
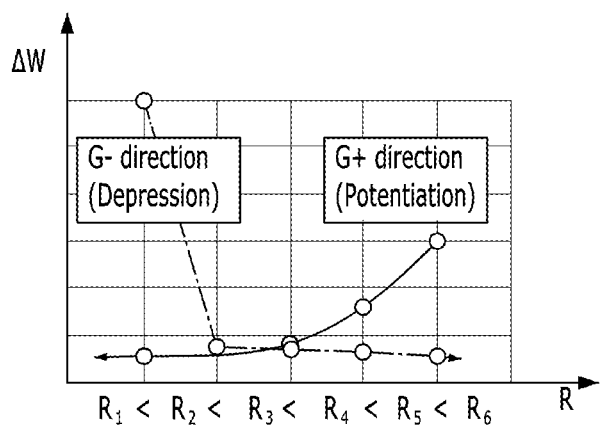

FIG. 3A is a cross-sectional view illustrating a synapse of a comparative example, and FIGS. 3B and 3C illustrate characteristics of the synapse shown in FIG. 3A.

Referring to FIG. 3A, the synapse 100 of the comparative example may include a first electrode 110, a second electrode 140, an oxygen-containing layer 120 disposed between the first electrode 110 and the second electrode 140, and a reactive metal layer 130 interposed between the oxygen-containing layer 120 and the second electrode 140. The reactive metal layer 130 is capable of reacting with oxygen ions of the oxygen-containing layer 120.

The first and second electrodes 110 and 140 may be disposed at two ends of the synapse 100 to which a voltage or current is applied, and may be formed of any of various electrically conductive materials such as metals or metal nitrides. The first electrode 110 may be connected to one of a corresponding row line 12 and a corresponding column line 22 shown in FIG. 1, and the second electrode 140 may be connected to the other one of the corresponding row line 12 and the corresponding column line 22, whereby the synapse 100 may be driven by electrical pulses. At least one of the first and second electrodes 110 and 140 may be omitted, such that the row line 12 or the column line 22 that is supposed to be coupled to the omitted electrode can function as the omitted electrode.

The oxygen-containing layer 120 is a layer containing oxygen ions, and may include any of various metal oxides, for example, oxides of transition metals such as Ti, Ni, Al, Nb, Hf, and V; perovskite-based oxides such as $Pr_{1-x}Ca_x MnO_3$ (PCMO) and $La_{1-x}Sr_xMnO_3$ (LCMO), and the like.

The reactive metal layer 130 is a layer capable of reacting with oxygen ions to form a dielectric oxide, and may include a metal such as Al, Ti, Ta, or Mo, or a nitride of the metal.

In an initial stage, the synapse 100 may be in a relatively low resistance state. Thus, to perform an operation of a neuromorphic device, an initialization operation for changing the synapse 100 from the low-resistance state to a high-resistance state may be required.

If voltage pulses with a certain polarity are applied through the first and second electrodes 110 and 140 to the synapse 100 when the synapse 100 in the low-resistance state, oxygen ions in the oxygen-containing layer 120 may move toward the reactive metal layer 130 and then react with a metal included in the reactive metal layer 130, thereby forming a dielectric oxide layer at an interface between the oxygen-containing layer 120 and the reactive metal layer 130. The dielectric oxide layer may include an oxide of the metal included in the reactive metal layer 130. As a result, the synapse 100 may undergo the reset operation and the resistance state of the synapse 100 may be changed to a high-resistance state. As the number of voltage pulses applied to the synapse 100 increases, a thickness of the dielectric oxide layer may increase, and thus the synapse 100 may undergo the depression operation such that the electrical conductivity of the synapse 100 may progressively decrease.

In contrast, if voltage pulses with a polarity opposite to the certain polarity are applied to the synapse 100 when the synapse 100 in the high-resistance state, oxygen ions may move in a direction from the reactive metal layer 130 toward the oxygen-containing layer 120, and thus the thickness of the dielectric oxide layer may decrease or the dielectric oxide layer may disappear. As a result, the synapse 100 may undergo the set operation and the resistance state of the synapse 100 may be changed to the low-resistance state. As the number of voltage pulses applied to the synapse 100 increases, the thickness of the dielectric oxide layer may decrease, and the synapse 100 may undergo the potentiation operation such that the electrical conductivity of the synapse 100 may progressively increase.

As described above, as the thickness of the dielectric oxide layer progressively increases or decreases by the voltage pulses applied to the synapse 100, the resistance state of the synapse 100 switches between the high-resistance state and the low-resistance state. Thus, the synapse 100 may have an analog behavior, such that the electrical conductivity of the synapse 100 in each of the high-resistance state and the low-resistance state progressively changes. However, this does not satisfy the characteristics described above with reference to FIGS. 2A to 2D. The characteristics of the synapse 100 will be described in detail with reference to FIGS. 3B and 3C.

Referring to FIG. 3B, if first-polarity voltage pulses are applied to the synapse 100 that is in the low-resistance state, the synapse 100 may undergo the potentiation operation and the electrical conductivity G of the synapse 100 may progressively increase as the number of the voltage pulses increases. However, a rate of increase in the electrical conductivity G is very high in an initial stage of the set operation and gradually decreases as the potentiation operation progresses. Thus, there is a problem in that the linearity of the synapse 100 is not satisfied.

In addition, if second-polarity voltage pulses with a voltage equal to or higher than a reset voltage are applied to the synapse 100 that is the low-resistance state, the reset operation may be performed such that the resistance state of the synapse 100 changes to the high-resistance state. With an increase in the number of second-polarity voltage pulses applied to the synapse 100 in the high-resistance state, the synapse 100 may undergo the depression operation and the electrical conductivity G of the synapse 100 may progressively decrease. However, an abrupt decrease in the electrical conductivity G may occur in the reset and depression operations. In addition, the rate of decrease in the electrical conductivity G is very high in an initial stage of the reset operation and gradually decreases as the depression operation progresses. The degree of decrease in the electrical conductivity G in the initial stage of the reset operation may be much larger than the degree of increase in the electrical conductivity G in the initial stage of the set operation. Thus, as shown in FIG. 3B, there is a problem in that the linearity and symmetry of the synapse 100 are not satisfied.

Referring to FIG. 3C, a rate of change in weight ΔW of the synapse 100 is not constant according to a current resistance R of the synapse 100. In the set operation, if the present resistance value R of the synapse 100 is relatively high (e.g., $R_5$ or $R_6$), the rate of change in the weight ΔW of the synapse 100 may increase in the G+ direction. In other words, in the initial stage of the set operation when the synapse 100 has the relatively high resistance, the rate of change in the electrical conductivity G of the synapse 100 may be high. In contrast, in the reset operation when the present resistance value R of the synapse 100 is relatively low (e.g., $R_1$), the rate of change in the weight ΔW of the synapse 100 may increase in the G− direction. In other words, in the initial stage of the reset operation when the synapse 100 has the relatively low resistance, the rate of change in the electrical conductivity G of the synapse 100 may be high. This suggests that the linearity of the synapse 100 is not satisfied.

Additionally, in the initial stage, the rate of change in the weight ΔW in the G− direction is higher than the rate of change in the weight ΔW in the G+ direction, as shown in FIG. 3C. This indicates that the symmetry of the synapse 100 is not satisfied.

The reason why the above-described problems arise are that the rate of change in the resistance value R of the synapse 100 in each of the initial stages of the set and reset operations is high, and that the speed of the reset operation in which the dielectric oxide layer is formed is much higher than the speed of the set operation in which the dielectric oxide layer disappears.

Embodiments of the present disclosure are directed to synapses capable of overcoming the problems of the comparative example.

Figure 4A:
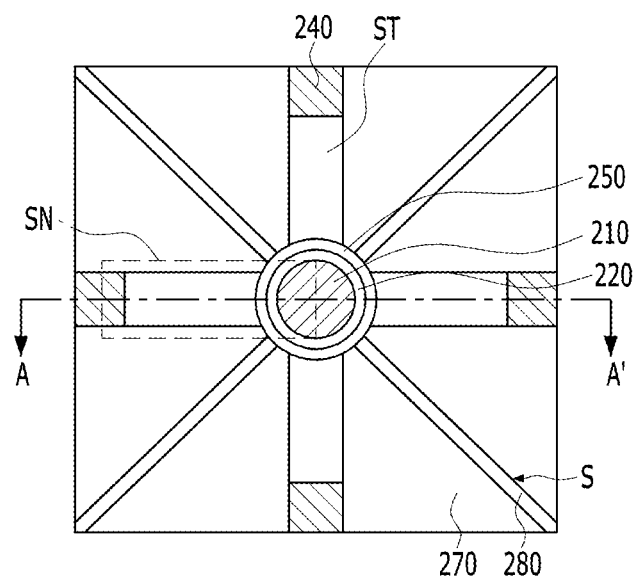
FIGS. 4A and 4B are views illustrating a neuromorphic device according to an embodiment.
Figure 4B:
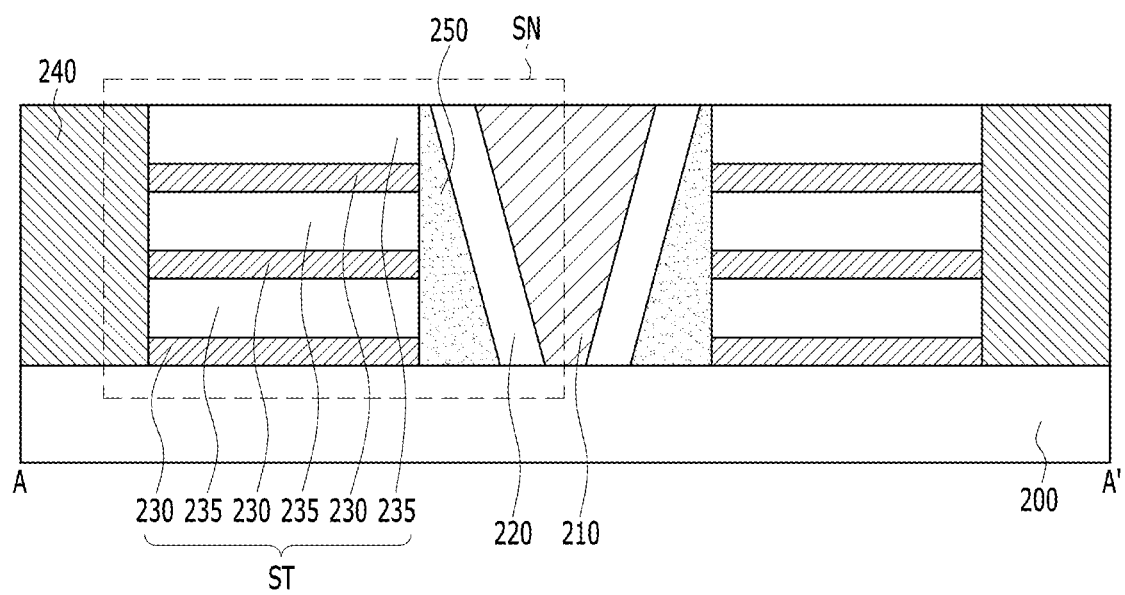

FIGS. 4A and 4B are views illustrating a neuromorphic device according to an embodiment. FIG. 4A shows a planar view of the neuromorphic device, and FIG. 4B shows a cross-sectional view of the neuromorphic device, taken along a line A-A' of FIG. 4A.

Referring to FIGS. 4A and 4B, the neuromorphic device may include a substrate 200, a first electrode 210, a second electrode 240 disposed over the substrate 200, a stack structure ST disposed between the first electrode 210 and the second electrode 240, an oxygen-containing layer 220, and an oxygen diffusion-retarding layer 250 disposed between the stack structure ST and the first electrode 210. The first and second electrodes 210 and 240 may each extend in a direction substantially perpendicular to a top surface of the substrate 200, and may be spaced apart from each other in a horizontal direction parallel to the top surface of the substrate 300. The stack structure ST may include a plurality of reactive metal layers 230 and a plurality of insulating layers 235, which are alternately stacked over the substrate 200. The oxygen diffusion-retarding layer 250 may encircle a sidewall of the first electrode 210, and may extend in the direction substantially perpendicular to the top surface of the substrate 200. Here, the oxygen diffusion-retarding layer 250 is disposed between the stack structure ST and the oxygen-containing layer 220. The oxygen-containing layer 220 is disposed between the first electrode 210 and the oxygen diffusion-retarding layer 250.

The substrate 200 may include a lower structure (not shown), which may be used in the neuromorphic device. The lower structure may include a line, a neuron circuit, or the like, which is coupled to the first electrode 210 and/or the second electrode 240.

The first and second electrodes 210 and 240 may be disposed at two ends of a synapse SN and may include any of various conductive materials such as a metal, a metal nitride, and the like. A voltage or current may be applied to each of the first and second electrodes 210 and 240. The first electrode 210 may be connected to any one of the row lines 12 shown in FIG. 1, and the second electrode 240 may be connected to any one of the column lines 22 shown in FIG. 1, or vice versa. The synapse SN may be driven by electrical pulses applied through the first and second electrodes 210 and 240.

In an embodiment, one of the row lines 12 and/or one of the column lines 22 of FIG. 1 may be disposed in the substrate 200, may be respectively coupled to lower ends of the first electrode 210 and/or the second electrode 240, and may respectively drive the first electrode 210 and/or the second electrode 240. Alternatively, in another embodiment, the row line 12 and/or the column line 22 of FIG. 1 may be disposed over the first electrode 210 and/or the second electrode 240, and may be respectively coupled to upper ends of the first electrode 210 and/or the second electrode 240.

The first electrode 210 and the second electrodes 240 may each have a pillar shape, which extends in a vertical direction from the top surface of the substrate 200, the vertical direction corresponding to the direction substantially perpendicular to the top surface of the substrate 200. In the planar view shown by FIG. 4A, the first electrode 210 has a circular cross section and each of the second electrodes 240 has a rectangular cross section, but the first and second electrodes 210 and 240 may be shaped differently in other embodiments. The first electrode 210 and the second electrodes 240 may be modified to have any of various shapes according to desired fabrication and/or operation processes. The first electrode 210 may face one or more of the second electrodes 240. That is, the first electrode 210 may be disposed adjacent to and may electrically interact with one or more of the second electrodes 240. As shown in the planar view of FIG. 4A, one first electrode 210 may face four second electrodes 240, which are spaced apart from the first electrode 210 in four directions parallel to the top surface of the substrate 200, respectively, but the first electrode 210 may face a greater or lesser number of second electrodes 240 in other embodiments. That is, the neuromorphic device may include multiple first electrodes like the first electrode 210, and a greater or fewer number of the second electrodes 240. When one first electrode 210 faces multiple second electrodes 240, the multiple second electrodes 240 may be separated from each other.

The reactive metal layer 230 may be capable of reacting with oxygen ions to form a dielectric oxide, and may include a metal such as Al, Ti, Ta, or Mo, or a nitride of the metal. In the cross-sectional view shown by FIG. 4B, three reactive metal layers 230 are stacked in the vertical direction, but a number of the reactive metal layers 230 may be variously modified as long as the stack structure ST includes multiple reactive metal layers 230. Thicknesses of the reactive metal layers 230 may be substantially equal to each other. Therefore, contact areas between the reactive metal layers 230 and the oxygen diffusion-retarding layer 250 may be substantially the same. In the vertical direction, the insulating layer 235 may be interposed between two adjacent reactive metal layers 230 and may electrically isolate the two adjacent reactive metal layers 230 from each other. The insulating layer 235 may include any of various insulating materials such as a silicon oxide, a silicon nitride, or a combination thereof. The stack structure ST may include two or more reactive metal layers 230 and the at least one insulating layer 235 interposed between adjacent reactive metal layers 230 in the vertical direction.

The stack structure ST may be disposed between the first electrode 210 and one of the second electrodes 240. For example, in the planar view shown by FIG. 4A, four stack structures ST may be formed, and may respectively correspond to the four second electrodes 240. A first side surface of each of the four stack structures ST may be in contact with a respective one of the four second electrodes 240, and a second side surface of each of the four stack structures ST, which is opposite to the first side surface, may face the first electrode 210 in one of the four directions. The four stack structures ST may be separated from each other.

To electrically separate the second electrodes 240 and the stack structures ST arranged in the four directions from each other, a space between a first combination of one of the second electrodes 240 and the stack structure ST corresponding to the one second electrode 240 and a second combination of another one of the second electrodes 240 and the stack structure ST corresponding to the other second electrode 240 may be filled with an interlayer insulating layer 270. Furthermore, to separate the second electrodes 240 and the stack structures ST arranged in the four directions more reliably, a slit S may be formed in the interlayer insulating layer 270 that is formed in the space between the first combination and the second combination, such that the interlayer insulating layer 270 is divided into two portions. The slit S may be formed in a region of the interlayer insulating layer 270 disposed between the first combination and the second combination. For example, when the four second electrodes 240 and the four stack structures ST each have a shape extending in horizontal and longitudinal directions from the first electrode 210, the slit S may have a shape extending in a diagonal direction from the first electrode 210. A filling layer 280 may be formed in the slit S and may include an insulating material or the like.

The oxygen-containing layer 220 may contain oxygen, and may include any of various metal oxides, for example, an oxide of a transition metal such as Ti, Ni, Al, Nb, Hf, or V; a perovskite-based oxide such as PCMO or LCMO; and the like. As shown in the planar view of FIG. 4A, the oxygen-containing layer 220 is disposed against a side surface of the first electrode 210 and encircles the first electrode 210, but other spatial relationships between the oxygen-containing layer 220 and the first electrode 210 are possible. The oxygen-containing layer 220 may extend in a substantially vertical direction along the side surface of the first electrode 210, and may be interposed between the stack structure ST and the first electrode 210. In another embodiment, the oxygen-containing layer 220 may be separated into four pieces respectively interposed between the four stack structures ST and the first electrode 210. A thickness of the oxygen-containing layer 220 may be substantially constant along a height direction that corresponds to the direction along the side surface of the first electrode 210. However, according to desired fabrication and/or operation processes, the thickness of the oxygen-containing layer 220 may vary along the height direction.

The oxygen diffusion-retarding layer 250 may retard the movement of oxygen ions from the oxygen-containing layer 220 to the reactive metal layers 230. The oxygen diffusion-retarding layer 250 may be formed of any of various semiconductor materials or dielectric materials, such as an oxide, a nitride, or a combination thereof. In the planar view shown by FIG. 4A, the oxygen diffusion-retarding layer 250 is disposed against a side surface of the oxygen-containing layer 220 and encircles the oxygen-containing layer 220, but other spatial relationships between the oxygen diffusion-retarding layer 250 and the oxygen-containing layer 220 are possible. The oxygen diffusion-retarding layer 250 may extend in a substantially vertical direction along the side surface of the oxygen-containing layer 220, and may be interposed between the stack structure ST and the oxygen-containing layer 220. In another embodiment, the oxygen diffusion-retarding layer 250 may be separated into four pieces that face the four stack structures ST, respectively, and are in contact with the oxygen-containing layer 220.

The oxygen diffusion-retarding layer 250 may interfere with the movement of oxygen ions without completely blocking the movement of oxygen ions, thereby reducing the rate of formation of a dielectric oxide layer that is formed in each of the reactive metal layers 230 at an interface between each of the reactive metal layers 230 and the oxygen diffusion-retarding layer 250. That is, the oxygen diffusion-retarding layer 250 may slow the movement of oxygen ions that migrate from the oxygen-containing layer 220 to the reactive metal layers 230. The oxygen diffusion-retarding layer 250 may have a thickness that incompletely blocks the movement of oxygen ions. For example, it may have a thickness of less than 10 nm.

Specially, in this embodiment, the thickness of the oxygen diffusion-retarding layer 250 may increase along a vertical direction from a top of the oxygen diffusion-retarding layer 250 toward a bottom of the oxygen diffusion retarding layer 250. Therefore, the thickness of the oxygen diffusion-retarding layer 250 between each of the different reactive metal layers 230 having different vertical positions and the oxygen-containing layer 220 may be different. In other words, the reactive metal layers 230 having different vertical positions may include dielectric oxide layers with different rates of formation and/or thicknesses at the interface with the oxygen diffusion-retarding layer 250. Therefore, the symmetry and linearity of the synapse SN may be improved. This will be described later with reference to FIGS. 5A to 5C in more detail.

The thickest portion of the oxygen diffusion-retarding layer 250 may have a relatively small thickness that incompletely blocks the movement of oxygen ions.

A synapse SN may include one first electrode 210 and one of the second electrodes 240 facing the one first electrode 210, as well as the stack structure ST, the oxygen diffusion-retarding layer 250, and the oxygen-containing layer 220, which are disposed between the one first electrode 210 and the one second electrode 240. Therefore, the planar view of FIG. 4A shows four synapses SN. These synapses SN may be separated from each other and operate independently. However, this embodiment is not limited thereto, and a number of the synapses SN may be variously modified.

An example of an operating method of the synapse SN will be described with reference to FIGS. 5A to 5C.

Figure 5A:
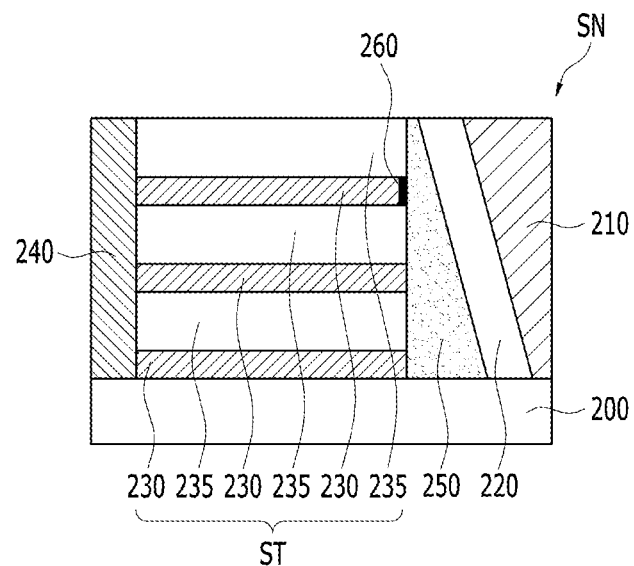
FIGS. 5A to 5C are cross-sectional views illustrating a reset operation of a synapse of FIGS. 4A and 4B.
Figure 5B:
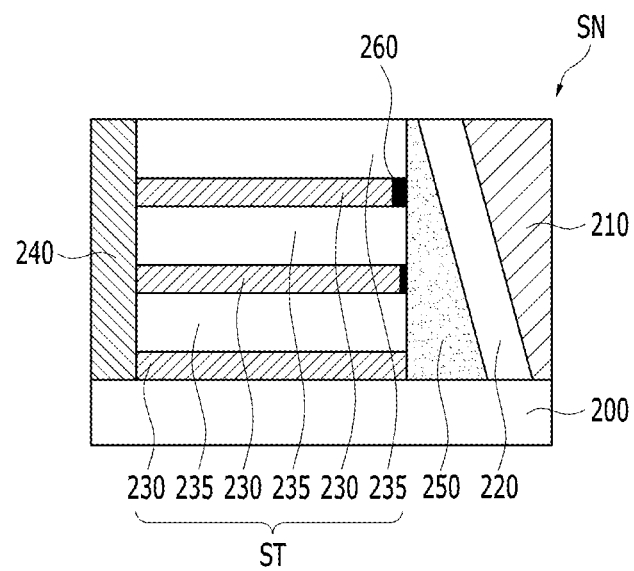
Figure 5C:
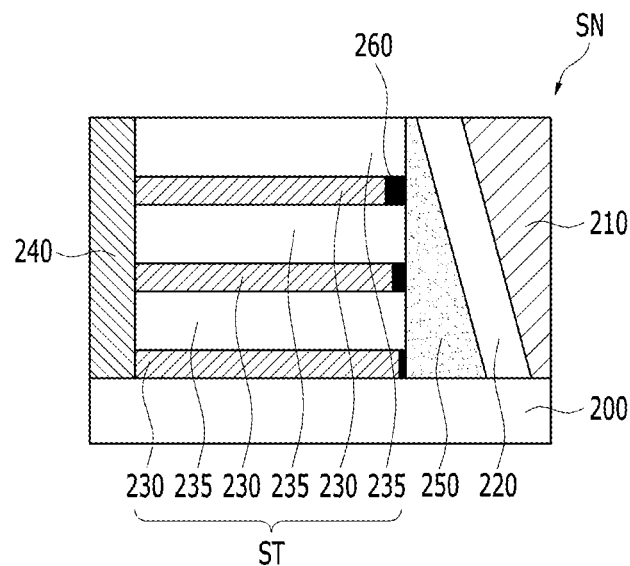

FIGS. 5A to 5C are cross-sectional views illustrating a reset operation of the synapse of FIGS. 4A and 4B. FIG. 5A shows a beginning stage of the reset operation, FIG. 5B shows a middle stage of the reset operation, and FIG. 5C shows a last stage of the reset operation. For convenience of explanation, one synapse SN is shown in FIGS. 5A to 5C.

Before the synapse SN starts to operate, that is, when the synapse SN is in an initial state, there is no dielectric oxide layer between the oxygen-containing layer 220 and the reactive metal layers 230, as shown in FIG. 4B, and thus the synapse SN may be in a low-resistance state.

If reset voltage pulses, having a certain polarity and a magnitude equal to or larger than a reset voltage, are applied to the synapse SN when the synapse SN is in the low-resistance state through the first and second electrodes 210 and 240, oxygen ions in the oxygen-containing layer 220 may move toward the reactive metal layers 230 and may pass through the oxygen diffusion-retarding layer 250. As a result, a dielectric oxide layer may be formed in at least one of the reactive metal layers 230 at the interface between the at least one of the reactive metal layers 230 and the oxygen diffusion-retarding layer 250. Thus, the synapse SN may undergo a reset operation, in which the resistance state of the synapse SN is changed from the low-resistance state to a high-resistance state.

During the reset operation, a voltage applied to the second electrode 240 may be greater than a voltage applied to the first electrode 210. For example, a positive voltage having a magnitude equal to or larger than the reset voltage may be applied to the second electrode 240, and a ground voltage may be applied to the first electrode 210. When the reset voltage is applied in the form of pulses that are applied to the second electrode 240 repeatedly, the magnitude and width of the reset voltage pulses may be substantially constant.

In the above reset operation, referring to FIG. 5A, in the beginning stage of the reset operation, a dielectric oxide layer 260 may appear with a small thickness in a first one of the reactive metal layers 230 corresponding to the narrowest portion of the oxygen diffusion-retarding layer 250. That is, the dielectric oxide layer 260 may be formed in the uppermost reactive metal layer 230 because the thinnest parts of the oxygen diffusion-retarding layer 250 interferes with the movement of oxygen ions less than the thicker parts of the oxygen diffusion-retarding layer 250, and the reaction between the oxygen ions and the reactive metal layer 230 occurs quickly in the reactive metal layer 230 adjacent to the thinnest parts of the oxygen diffusion-retarding layer 250.

Referring to FIG. 5B, as the reset operation proceeds, that is, as the number of the reset voltage pulses applied to the synapse SN increases, another dielectric oxide layer 260 may appear with a small thickness in a second one of the reactive metal layers 230 corresponding to a thicker portion of the oxygen diffusion-retarding layer 250. That is, in the middle stage of the reset operation, the dielectric oxide layer 260 may be formed in the middle reactive metal layer 230. The thickness of the dielectric oxide layer 260 that has been formed in the uppermost reactive metal layer 230 may be greater at this time than in the beginning stage of the reset operation of FIG. 5A.

Referring to FIG. 5C, as the reset operation further proceeds, that is, the number of the reset voltage pulses applied to the synapse SN further increases, a dielectric oxide layer 260 may appear with a small thickness in a third one of the reactive metal layers 230 corresponding to the thickest portion of the oxygen diffusion-retarding layer 250. That is, in the last stage of the reset operation, the dielectric oxide layer 260 may be formed in the lowermost reactive metal layer 230. At this time, the thickness of the dielectric oxide layer 260 in each of the uppermost and middle reactive metal layers 230 may further be greater at this time than in the middle stage of the reset operation of FIG. 5B.

By the aforementioned method, since the rate of formation of the dielectric oxide layer 260 is reduced by the oxygen diffusion-retarding layer 250, the reset operation may be slower than in a synapse without the diffusion-retarding layer 250, and thus an abrupt change in the electrical resistance in the beginning stage of the reset operation may be prevented. Specifically, as the reset operation proceeds, a collective size and/or volume of the dielectric oxide layers 260 formed in the synapse SN may grow at an increasing rate. Therefore, the rate of increase in the electrical resistance may be relatively small in the beginning stage of the reset operation, and the rate of increase in the electrical resistance may grow as the reset operation proceeds. As a result, the electrical resistance of the synapse SN does not abruptly increase in the beginning stage of the reset operation, and the rate of change in the electrical resistance during the reset operation is not significantly larger than the rate of change in the electrical resistance during the set operation, unlike the synapse 100 of the comparative example. In other words, the symmetry and linearity of the synapse SN may be secured.

Meanwhile, as described above, in the neuromorphic device of FIGS. 4A and 4B, the number of second electrodes 240 and respective stack structures ST that correspond to one first electrode 210, that is, the number of synapses SN, may be variously modified. An example of this will be described with reference to FIG. 6.

Figure 6:
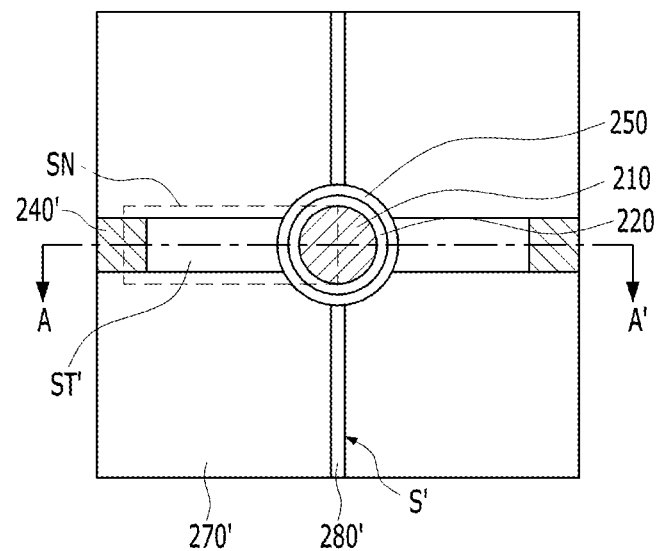
FIG. 6 is a planar view illustrating a neuromorphic device according to another embodiment.

FIG. 6 is a planar view illustrating a neuromorphic device according to another embodiment. A cross-sectional view taken along a line A-A' of FIG. 6 may be substantially the same as the cross-sectional view shown in FIG. 4B, and thus the illustration thereof will be omitted. In addition, differences from the above-described embodiment will mainly be described.

Referring to FIG. 6, in the neuromorphic device, two second electrodes 240', and two corresponding stack structures ST', may face one first electrode 210. That is, the neuromorphic device may include two synapses SN sharing one first electrode 210.

In this regard, this embodiment may be different from the above embodiment of FIG. 4A. The neuromorphic device of FIG. 4A includes four second electrodes 240, and four corresponding stack structures ST, which face one first electrode 210. That is, the neuromorphic device illustrated in FIG. 4A includes four synapses SN sharing one first electrode 210.

In the embodiment shown in FIG. 6, the second electrodes 240' are spaced apart from the first electrode 210 in first and second directions. An interlayer insulating layer 270' may fill a space between a first combination of one of the second electrodes 240' and the stack structure ST' corresponding to the one of the second electrodes 240' and a second structure of the other one of the second electrodes 240' and the stack structure ST' corresponding to the other one of the second electrodes 240'. That is, the interlayer insulating layer 270' may electrically isolate the first combination extending in the first direction from the second combination extending in the second direction. The first combination and the second combination may be disposed at opposite sides of the first electrode 210. Furthermore, to separate the first and second combinations of the second electrodes 240' and the stack structures ST' more reliably, a slit S' may be formed in the interlayer insulating layer 270'. The slit S' may be formed along a third direction that crosses the first and second directions, the first to third directions being parallel to a top surface of a substrate. For example, when the two second electrodes 240' and the two stack structures ST' have shapes extending in two opposite horizontal directions with the first electrode 210, the slit S' may have a shape extending, using the third direction as a longitudinal direction, from the first electrode 210. A filling layer 280' may be disposed in the slit S' and may include an insulating material, or the like.

However, in other embodiments, a number of combinations of second electrodes and corresponding stack structures extending from the first electrode may be variously modified, and cross-sectional shapes of the second electrodes and the corresponding stack structures may be variously modified.

FIGS. 7A to 10B are views illustrating a method for fabricating a neuromorphic device according to an embodiment. FIGS. 7A, 8A, 9A, 9C, and 10A show planar views, and FIGS. 7B, 8B, 9B, and 10B show cross-sectional views taken along lines A-A' of FIGS. 7A, 8A, 9A, and 10A, respectively.

Figure 7A:
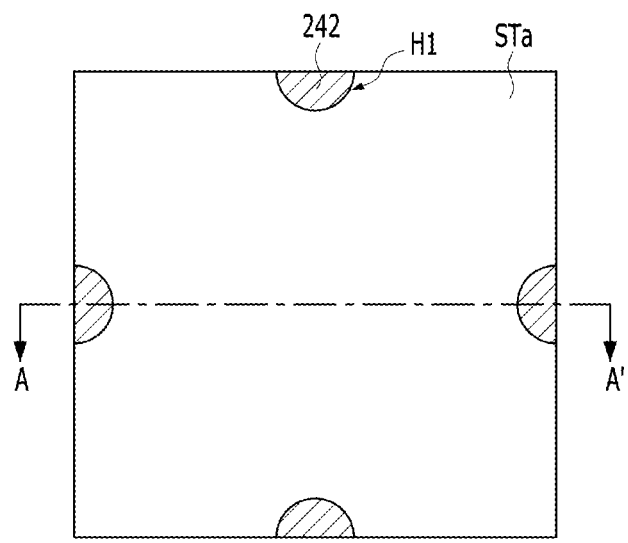
FIGS. 7A to 10B are views illustrating a method for fabricating a neuromorphic device according to an embodiment.
Figure 7B:
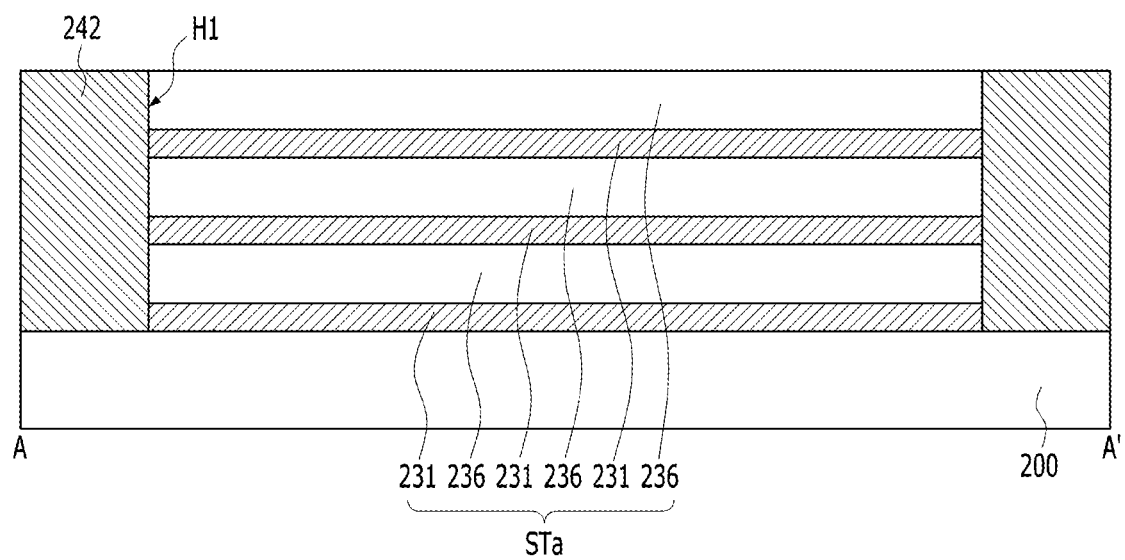

Referring to FIGS. 7A and 7B, an initial stack structure STa may be formed by alternately stacking a plurality of reactive metal materials 231 and a plurality of insulating materials 236 over a substrate 200.

Then, four first holes H1 penetrating through the initial stack structure STa may be formed by selectively etching the initial stack structure STa. A second electrode material 242 having a pillar shape may be formed in the first hole H1 by filling the first hole H1 with a conductive material. The second electrode material 242 may have a side surface that is in contact with each of the reactive metal materials 231 in the initial stack structure STa. The position of the second electrode material 242 may be modified in consideration of the position of a second electrode desired in the neuromorphic device, and additional second electrode materials 242 may be added in consideration of the number of second electrodes desired in the neuromorphic device, which will be described later in further detail.

Figure 8A:
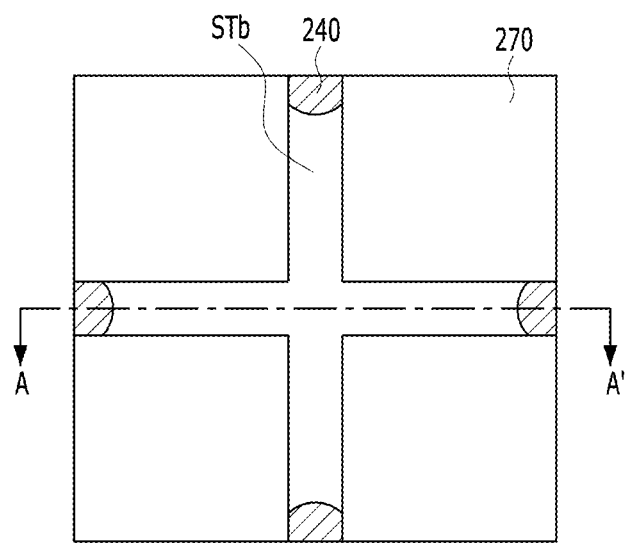
Figure 8B:
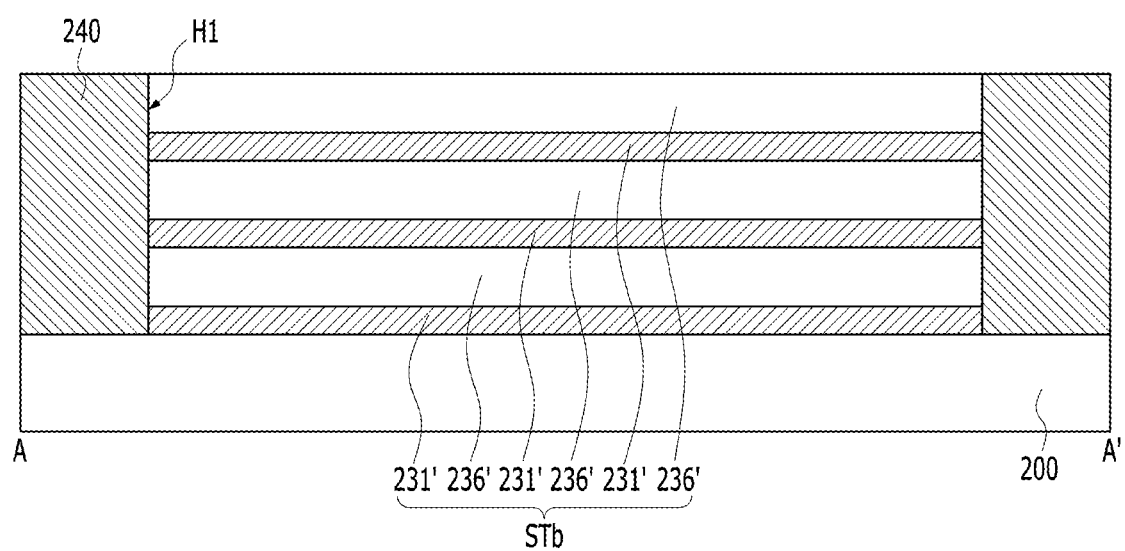

Referring to FIGS. 8A and 8B, the initial stack structure STa and the second electrode materials 242 may be patterned by selectively etching the initial stack structure STa and the second electrode materials 242. Specifically, the initial stack structure STa and the second electrode materials 242 may be patterned into a cross-like shape, as viewed in the planar view depicted by FIG. 8A. As a result, an intermediate stack structure STb may be formed that has a central portion and branch portions extending from the central portion in four directions. Second electrodes 240 coupled to the branch portions of the intermediate stack structure STb may also be formed. The intermediate stack structure STb may include reactive metal layers 231' and insulating layers 236', which are alternately stacked.

The process illustrated by FIGS. 8A and 8B may be used for forming the neuromorphic device of FIGS. 4A and 4B, but embodiments are not limited to forming the neuromorphic device of FIGS. 4A and 4B. The initial stack structure STa and the second electrode material 242 may be variously patterned to form various neuromorphic device structures. For example, to form the neuromorphic device of FIG. 6, two second electrode materials penetrating through the initial stack structure STa may be formed, and the initial stack structure STa and the two second electrode materials may be patterned into a line shape. Alternatively, when the number of stack structures and corresponding second electrodes is three or more than four, the initial stack structure STa may be patterned to have a central portion and three or more branch portions extending from the central portion in several directions corresponding to the number of stack structures and corresponding second electrodes of the neuromorphic device being formed.

After the intermediate stack structures STb and the second electrodes 240 are formed, an interlayer insulating layer 270 may be formed in a space around the stack structures ST and the second electrodes 240 by covering the intermediate stack structure STb and the second electrodes 240 with an insulating material over the substrate 200 and performing a planarization process until a top surface of the intermediate stack structure STb is exposed. The planarization process may include chemical mechanical polishing (CMP).

Figure 9A:
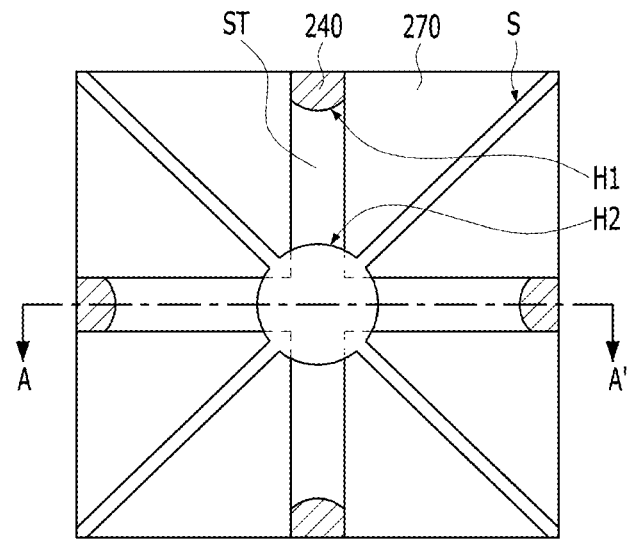
Figure 9B:
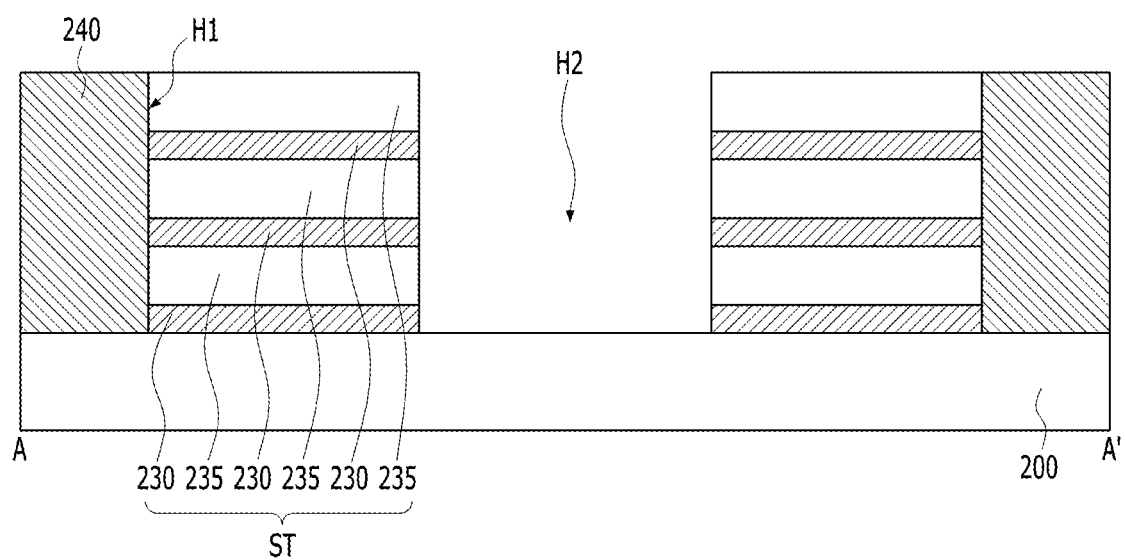

Referring to FIGS. 9A and 9B, a second hole H2, overlapping the central portion of the intermediate stack structure STb and penetrating through the intermediate stack structure STb, may be formed by selectively etching the intermediate stack structure STb. The second hole H2 may provide a space for forming an oxygen-containing layer, an oxygen diffusion-retarding layer, and a first electrode which will be described later.

As shown in the planar view of FIG. 9A, when the second hole H2 has a larger width than the central portion of the intermediate stack structure STb, the branch portions of the intermediate stack structure STb may be completely separated from each other by the second hole H2. In this case, a process of forming a slit S may be skipped. However, for convenience of explanation, a case in which the second hole H2 is formed together with the slit S is shown in FIG. 9A.

The slit S may penetrate through the interlayer insulating layer 270 and be formed by selectively etching the interlayer insulating layer 270. The slit S may extend from the second hole H2 in a direction that crosses a region between the branch portions of the intermediate stack structure STb. The process of forming the slit S may be performed simultaneously with the process of forming the second hole H2, and the slit S and second hole H2 may be formed using the same mask and etch process. In an embodiment, more than one slit S may be formed in the interlayer insulating layer 270.

Figure 9C:
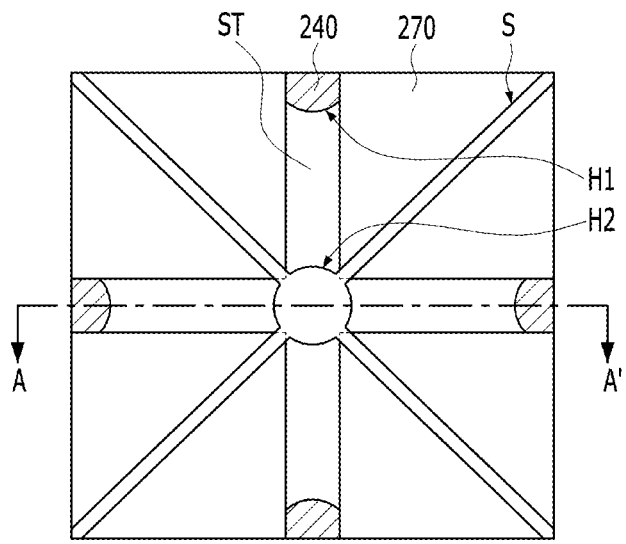

As shown in the planar view of FIG. 9C, when the second hole H2 has a smaller width than the central portion of the intermediate stack structure STb, the branch portions of the intermediate stack structure STb may not be separated from each other. In this case, the process of forming the slit S may be performed in order to separate the branch portions from each other. The slit S may penetrate through the intermediate stack structure STb and the interlayer insulating layer 270 and may be formed by selectively etching the intermediate stack structure STb and the interlayer insulating layer 270.

Referring to FIG. 9B, as the second hole H2 is formed by selectively etching the intermediate stack structure STb and the interlayer insulating layer 270, the four branch portions of the intermediate stack structure STb are separate from each other, and thus four stack structures ST respectively corresponding to the four branch portions are formed. The stack structure ST may include reactive metal layers 230 and insulating layers 235, which are alternately stacked.

Figure 10A:
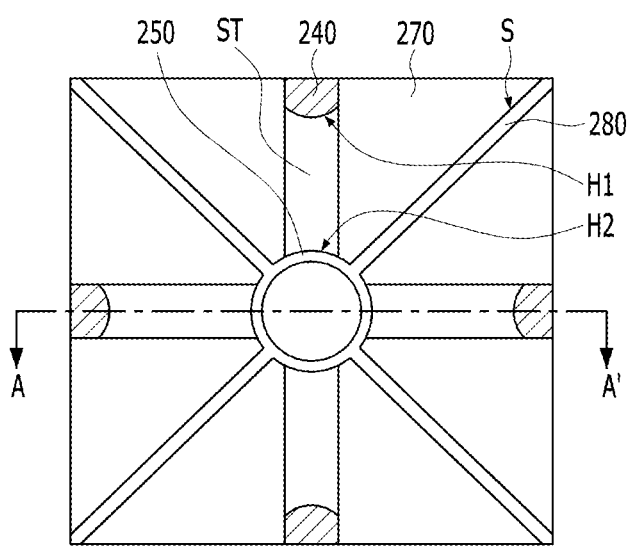
Figure 10B:
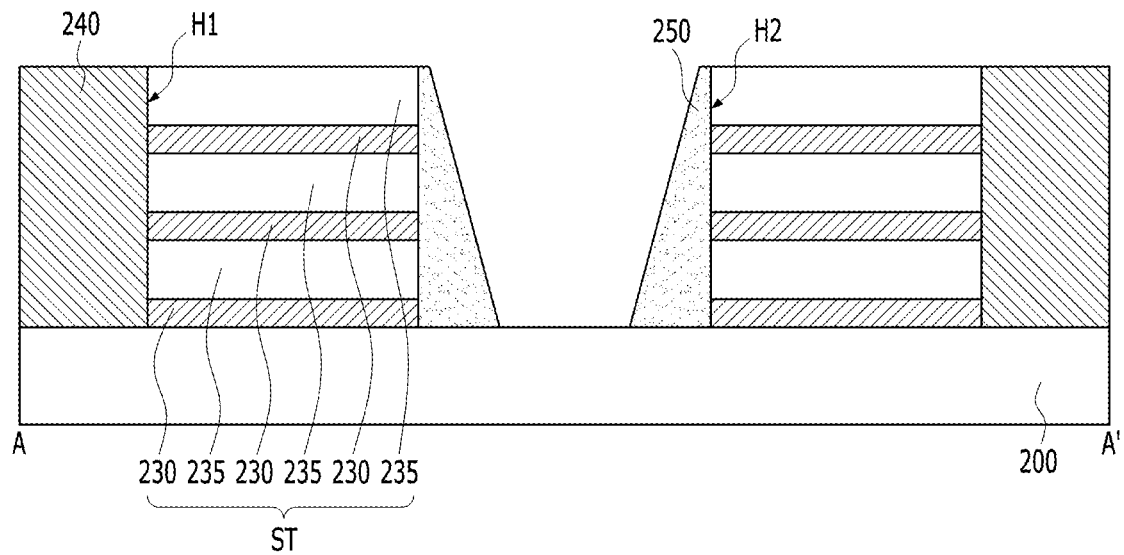

Referring to FIGS. 10A and 10B, an oxygen diffusion-retarding layer 250 may be formed against a sidewall of the second hole H2. Here, by controlling processing conditions, the oxygen diffusion-retarding layer 250 may be formed with a thickness that increases from the top of the diffusion-retarding layer 250 to the bottom of the diffusion-retarding layer 250.

For example, the oxygen diffusion-retarding layer 250 may be formed by filling the second hole H2 with an oxygen diffusion-retarding material and dry etching the oxygen diffusion-retarding material using a mask that exposes a central portion of the oxygen diffusion-retarding material. Due to characteristics of the dry etching, a plurality of polymers may be accumulated on the etched surface of the etching target as the etching proceeds, and thus the thickness of the oxygen diffusion-retarding layer 250 may increase from the top of the oxygen diffusion-retarding layer 250 to the bottom of the oxygen diffusion-retarding layer 250.

Alternatively, for example, the oxygen diffusion-retarding layer 250 may be formed by depositing the oxygen diffusion-retarding material in a thickness that does not completely fill the second hole H2 along the sidewall of the second hole H2, and performing a blanket etching process. Due to characteristics of the blanket etching process, the upper portion of the etching target may be etched by a relatively large amount, and thus the thickness of the oxygen diffusion-retarding layer 250 may increase from the top of the oxygen diffusion-retarding layer 250 to the bottom of the oxygen diffusion-retarding layer 250.

Meanwhile, during the deposition of the oxygen diffusion-retarding material, the slit S, which has a narrow width, may also be filled with the oxygen diffusion-retarding material. Since the slit S has a narrow width, the oxygen diffusion-retarding material within the slit S may not be removed during a subsequent etching process of the oxygen diffusion-retarding material. As a result, a filling layer 280, which may include the oxygen diffusion-retarding material, may be formed in the slit S. Although the slit S is not completely filled with the oxygen diffusion-retarding material, a remaining space of the slit S may be filled with an oxygen-containing material, which will be described later. In this case, the filling layer 280 may include the oxygen diffusion-retarding material and the oxygen-containing material.

Then, referring again to FIGS. 4A and 4B, an oxygen-containing layer 220 may be formed along a sidewall of the oxygen diffusion-retarding layer 250 in the second hole H2. The oxygen-containing layer 220 may be formed by depositing the oxygen-containing material along the structure illustrated by FIGS. 10A and 10B, and performing a blanket etching process to the oxygen-containing material.

Then, a first electrode 210, filling a remaining space of the second hole H2 that is partially filled with the oxygen-containing layer 220 and the oxygen diffusion-retarding layer 250, may be formed. The first electrode 210 may be formed by depositing a conductive material in a sufficient thickness to fill the second hole H2, which is partially filled with the oxygen-containing layer 220 and the oxygen diffusion-retarding layer 250, and performing a planarization process until the top surface of the stack structure ST is exposed.

As a result, the neuromorphic device shown in FIGS. 4A and 4B may be fabricated. However, the fabricating method described above may be modified in various ways.

Meanwhile, the neuromorphic device shown in the cross-sectional views of FIGS. 4A and 4B may be variously modified as long as the thickness of the oxygen diffusion-retarding layer 250 between the reactive metal layers 230 and the oxygen-containing layer 220 varies along a height of the oxygen diffusion-retarding layer 250. An example of this will be described with reference to FIGS. 11 and 12.

Figure 11:
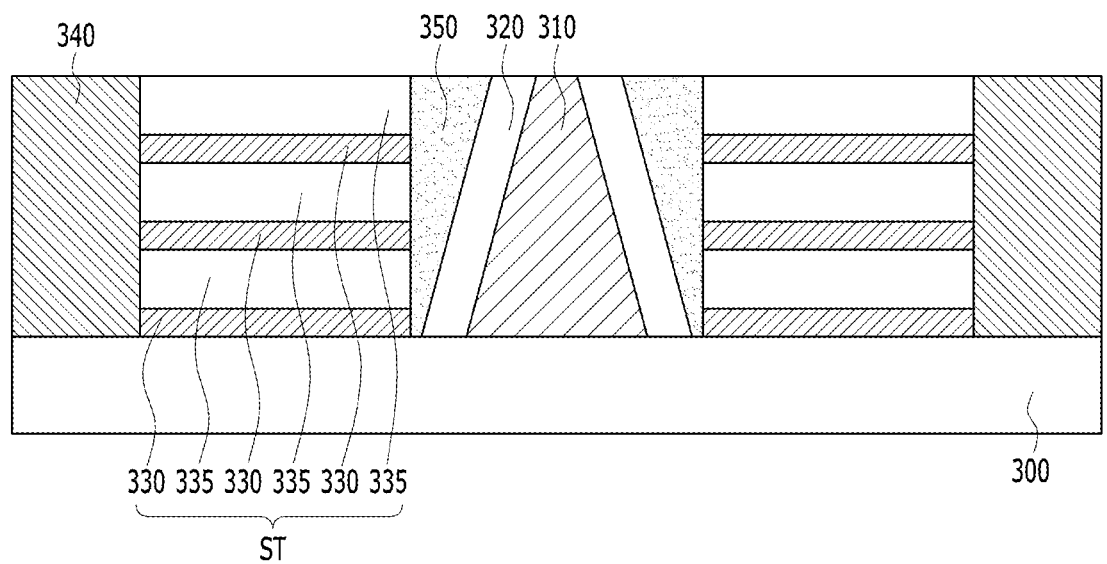
FIG. 11 is a cross-sectional view illustrating a neuromorphic device according to yet another embodiment.

FIG. 11 is a cross-sectional view illustrating a neuromorphic device according to yet another embodiment.

Referring to FIG. 11, the neuromorphic device may include a substrate 300, a first electrode 310, a second electrode 340, a stack structure ST disposed between the first electrode 310 and the second electrode 340, an oxygen-containing layer 320 disposed between the stack structure ST and the first electrode 310, and an oxygen diffusion-retarding layer 350 disposed between the stack structure ST and the oxygen-containing layer 320 The first and second electrodes 310 and 340 may be disposed over the substrate 300, may extend in a vertical direction perpendicular to a top surface of the substrate 300, and may be spaced apart from each other in a horizontal direction parallel to the top surface of the substrate 300. The stack structure ST may include a plurality of reactive metal layers 330 and a plurality of insulating layers 335, which are alternately stacked over the substrate 300. The oxygen-containing layer 320 may substantially extend in the vertical direction along a side surface of the first electrode 310. The oxygen diffusion-retarding layer 350 may also substantially extend in the vertical direction along side surfaces of the stack structure ST and the oxygen-containing layer 320.

Here, unlike the embodiment of FIGS. 4A and 4B, a thickness of the oxygen diffusion-retarding layer 350 may decrease from a top of the oxygen diffusion-retarding layer 350 to a bottom of the oxygen diffusion-retarding layer. Since the oxygen diffusion-retarding layer 350, the oxygen-containing layer 320, and the first electrode 310 are formed in a hole having a substantially vertical sidewall, the first electrode 310 may have a width that increases from a top of the first electrode 310 to a bottom of the first electrode, and may have a shape that depends on the shape of the oxygen diffusion-retarding layer 350. The oxygen-containing layer 320 may have a substantially constant thickness along a height direction.

Figure 12:
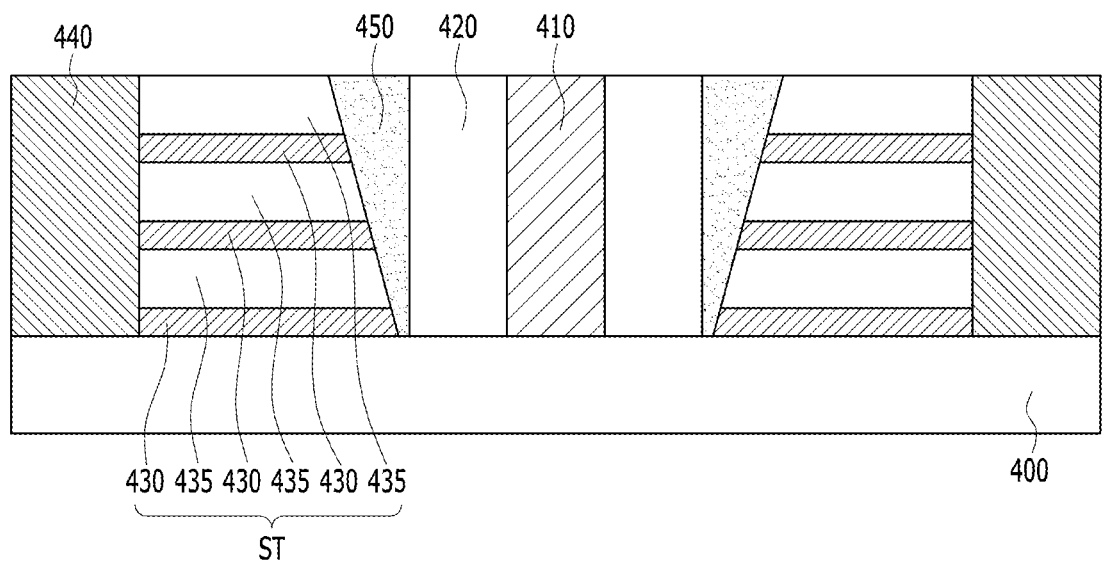
FIG. 12 is a cross-sectional view illustrating a neuromorphic device according to yet another embodiment.

FIG. 12 is a cross-sectional view illustrating a neuromorphic device according to yet another embodiment.

Referring to FIG. 12, the neuromorphic device may include a substrate 400, a first electrode 410, a second electrode 440, a stack structure ST disposed between the first electrode 410 and the second electrode 440, an oxygen-containing layer 420 disposed between the stack structure ST and the first electrode 410, and an oxygen diffusion-retarding layer 450 disposed between the stack structure ST and the oxygen-containing layer 420. The first and second electrodes 410 and 440 are disposed over the substrate 400, extend in a vertical direction perpendicular to a top surface of the substrate 400, and are spaced apart from each other in a horizontal direction parallel to the top surface of the substrate 300. The stack structure ST includes a plurality of reactive metal layers 430 and a plurality of insulating layers 435, which are alternately stacked over the substrate 400. The oxygen-containing layer 420 extends in the vertical direction, along the first electrode 410. The oxygen-containing layer 450 substantially extends in the vertical direction, along a side surface of the stack structure ST.

Here, unlike the embodiment of FIGS. 4A and 4B, a hole, in which the oxygen diffusion-retarding layer 450, the oxygen-containing layer 420, and the first electrode 410 are disposed, may have a width that decreases from a top of the hole to a bottom of the hole. That is, a sidewall of the hole may be sloped. A sidewall of the oxygen diffusion-retarding layer 450 may be in contact with the sloped sidewall of the hole, and another sidewall of the oxygen diffusion-retarding layer 450 may be substantially vertical. Therefore, the thickness of the oxygen diffusion-retarding layer 450 may decrease from a top of the oxygen diffusion-retarding layer 450 to a bottom of the oxygen diffusion-retarding layer. The first electrode 410 and the oxygen-containing layer 420 may each have a substantially constant width and/or thickness along a height direction.

In other words, the thickness of the oxygen diffusion-retarding layer 450 may vary along a height direction. On the other hand, the width and/or thickness of each of the first electrode 410 and the oxygen-containing layer 420 may or may not vary along a height direction.

In the above embodiments, the speed of the reset operation may be generally reduced and the symmetry with the set operation may be ensured by the existence of the oxygen diffusion-retarding layer. Furthermore, in the above embodiments, the resistance of the synapse may be more gradually changed due to the sequential formation and/or thickness change of multiple dielectric oxide layers in respective reactive metal layers, depending on the thickness of the oxygen diffusion-retarding layer between the reactive metal layers and the oxygen-containing layer, and thus the linearity of the synapse may be ensured.

In addition, the rate of formation and/or disappearance of the dielectric oxide layer between different reactive metal layers and the oxygen-containing layer may vary depending on the contact areas and/or facing areas between the reactive metal layers and the oxygen-containing layer. By using the design depicted by FIG. 12, the linearity and symmetry of the synapse may be further secured. An example of the linearity and symmetry of the synapse will be described with reference to FIGS. 13 and 14 in more detail.

Figure 13:
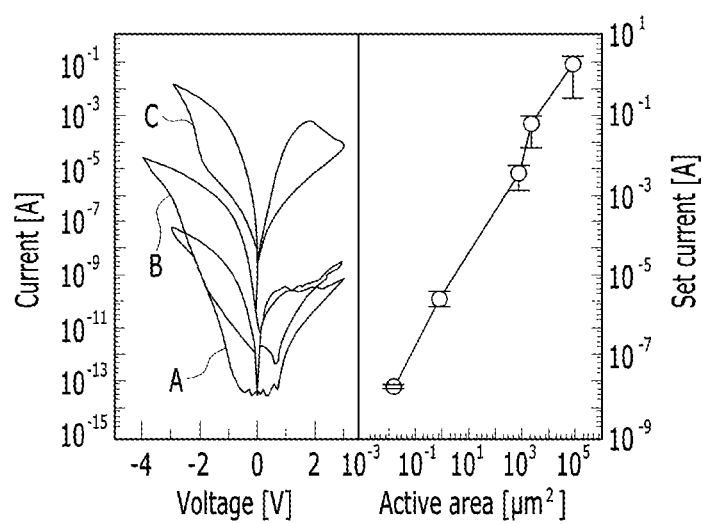
FIG. 13 is a graph illustrating a current through a synapse according to a size of a contact area and/or facing area between a reactive metal layer and an oxygen-containing layer in the synapse.

FIG. 13 is a graph illustrating a current flowing through a synapse according to a size of a contact area and/or facing area between a reactive metal layer and an oxygen-containing layer in the synapse.

Referring to FIG. 13, the contact area and/or facing area between the reactive metal layer and the oxygen-containing layer are proportional to a set current and a reset current of the synapse. In other words, during a set operation, when the contact area and/or facing area between the reactive metal layer and the oxygen-containing layer is relatively large, the rate of disappearance of the dielectric oxide layer is relatively high. Also, during a reset operation, when the contact area and/or facing area between the reactive metal layer and the oxygen-containing layer is relatively large, the rate of formation of the dielectric oxide layer is relatively low.

Figure 14:
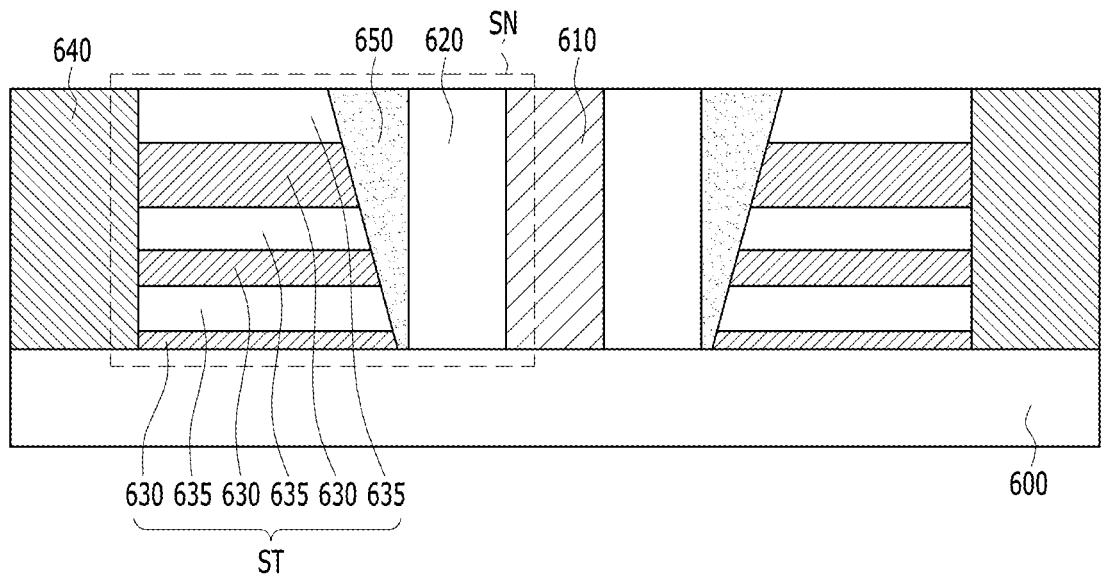
FIG. 14 is a cross-sectional view illustrating a neuromorphic device according to yet another embodiment.

FIG. 14 is a cross-sectional view illustrating a neuromorphic device according to yet another embodiment.

Referring to FIG. 14, the neuromorphic device may include a substrate 600, a first electrode 610, a second electrode 640, a stack structure ST disposed between the first electrode 610 and the second electrode 640, an oxygen-containing layer 620 disposed between the stack structure ST and the first electrode 610, and an oxygen diffusion-retarding layer 650 disposed between the stack structure ST and the oxygen-containing layer 620. The first and second electrodes 610 and 640 may be disposed over the substrate 600, may extend in a vertical direction perpendicular to a top surface of the substrate 600, and may be spaced apart from each other in a horizontal direction parallel to the top surface of the substrate 600. The stack structure ST may include a plurality of reactive metal layers 630 and a plurality of insulating layers 635, which are alternately stacked over the substrate 600. The oxygen-containing layer 620 may extend in the vertical direction along the first electrode 610. The oxygen diffusion-retarding layer 650 may substantially extend in the vertical direction, along a side surface of the stack structure ST.

Here, a thickness of the oxygen diffusion-retarding layer 650 may vary. At a given height, the thickness of the oxygen diffusion-retarding layer 650 may be proportional to a height of an adjacent one of the reactive metal layers 630. For example, the thickness of the oxygen diffusion-retarding layer 650 may decrease from a top of the oxygen diffusion-retarding layer 650 to a bottom of the oxygen diffusion-retarding layer 650, and heights of the reactive metal layers 630 may respectively increase from a bottom of the stack structure ST to a top of the stack structure ST. In this case, as a reset operation proceeds, a dielectric oxide layer may be formed first within the lowermost one of the reactive metal layers 630, which has the smallest thickness or height, among the dielectric oxide layers in the synapse, while a dielectric oxide layer may be formed last in the uppermost reactive metal layer 630, which has the thinnest thickness or height, among the dielectric oxide layers in the synapse. As described above, this is because the rate of formation of each of the dielectric oxide layers is inversely proportional to the thickness of the part of the oxygen diffusion-retarding layer 650 separating the reactive metal layer 630 from the oxygen-containing layer 620.

Furthermore, thicknesses or heights of the reactive metal layers 630 may be different from each other. For example, the thicknesses of the reactive metal layers 630 may increase along a height direction of the stack structure ST. Therefore, facing areas between different reactive metal layers 630 and the oxygen-containing layer 620 may be different from each other. Specifically, the thicknesses of the reactive metal layers 630 may be determined in consideration of the thickness of the oxygen diffusion-retarding layer 650. That is, the thickness of the reactive metal layer 630 may be relatively large when the thickness of a part of the oxygen diffusion-retarding layer 650 separating the reactive metal layer 630 from the oxygen-containing layer 620 is relatively large. For example, when the thickness of the oxygen diffusion-retarding layer 650 decreases from a top of the diffusion-retarding layer 650 to a bottom of the diffusion-retarding layer 650, the thicknesses of the reactive metal layers 630 may decrease from a top of the stack structure ST to a bottom of the stack ST structure. Accordingly, the facing areas between the reactive metal layers 630 and the oxygen-containing layer 620 may decrease from the top of the stack structure ST to the bottom of the stack structure ST. In this case, as a reset operation proceeds, a dielectric oxide layer may be formed first within the lowermost reactive metal layer 630 while a dielectric oxide layer may be formed last in the uppermost reactive metal layer 630. The thickness of the dielectric oxide layer in the lowermost reactive metal layer 630 may be greater than the thickness of the dielectric oxide layer in the uppermost reactive metal layer 630. As described above, this is because the rate of formation of the dielectric oxide layer is inversely proportional to the size of the facing area between the corresponding reactive metal layer 630 and the oxygen-containing layer 620.

As a result, by this embodiment, the rate of change in the resistance may be reduced as the reset operation proceeds, and thus the linearity and symmetry of the synapse SN may be further secured.

The neuromorphic device according to the above-described embodiments may be used in various devices or systems. This will be described by way of example with reference to FIG. 15.

Figure 15:
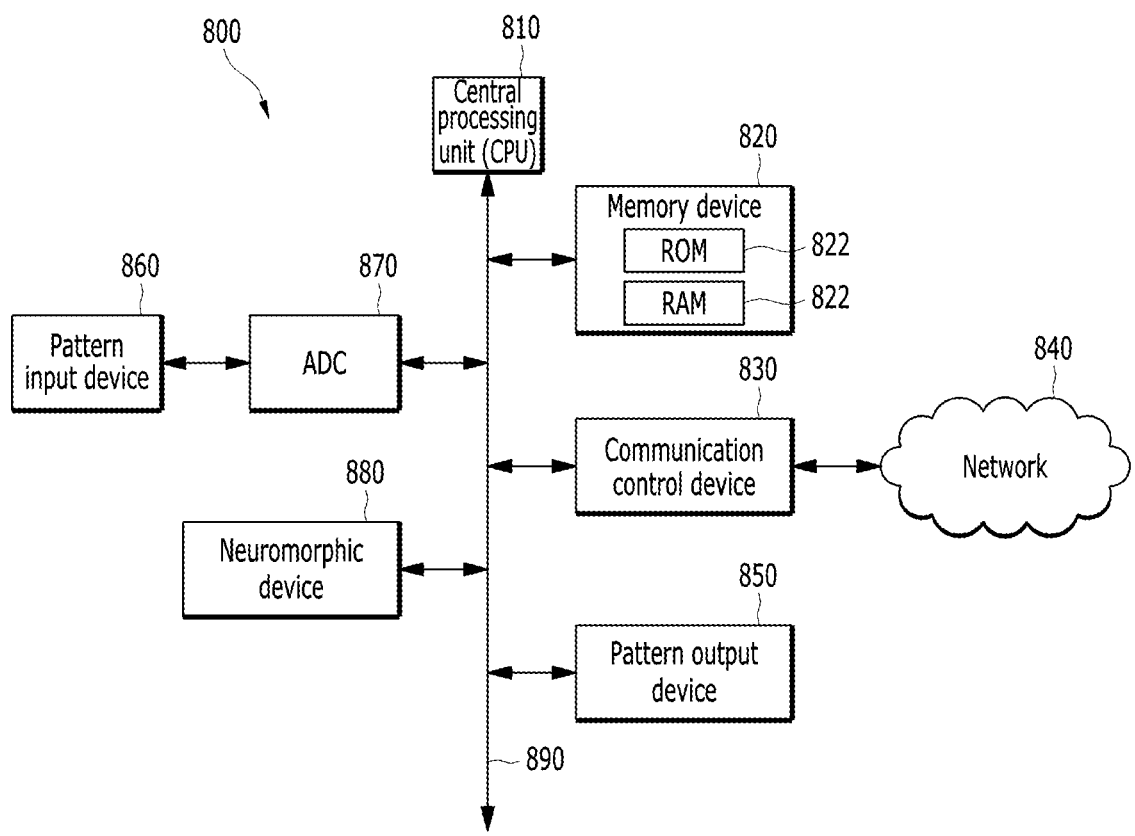
FIG. 15 shows a pattern recognition system according to an embodiment.

FIG. 15 shows a pattern recognition system 800 according to an embodiment.

The pattern recognition system 800 may be a system for recognizing various patterns, such as a speech recognition system or an image recognition system. The pattern recognition system 800 may be configured with the neuromorphic device of the above-described embodiments.

Referring to FIG. 15, the pattern recognition system 800 may include a central processing unit (CPU) 810, a memory device 820, a communication control device 830, a pattern output device 850, a pattern input device 860, an analog-digital converter (ADC) 870, a neuromorphic device 880, a bus line 890, and the like. The pattern recognition system 800 is connected to a network 840 through the communication control device 830.

The central processing unit 810 may generate and transmit various signals used in a learning operation performed by the neuromorphic device 880, and may perform various processing operations for recognizing patterns of sound, images or the like based on an output of the neuromorphic device 880. This central processing unit 810 may be connected, via the bus line 890, to the memory device 820, the communication control device 830, the pattern output device 850, the analog-digital converter 870, and the neuromorphic device 880.

The memory device 820 may store information in accordance with operations of the pattern recognition system 800. For this, the memory device 820 may include different memory devices. For example, the memory device 820 may include a ROM device 822, a RAM device 824, and the like. The ROM device 822 may store various programs or data which are used in the central processing unit 810 in order to perform the learning operation of the neuromorphic device 880, pattern recognition, etc. The RAM device 824 may store the program or data downloaded from the ROM device 822, or store data, such as sound or images, which have been converted or analyzed by the analog-digital converter 870.

The communication control device 830 may exchange recognized data (e.g., sound or images) with other communication control devices through the network 840.

The pattern output device 850 may output the recognized data (e.g., sound or images) in various manners. For example, the pattern output device 850 may include one or more of a printer, a display unit, and the like, and may output sound waveforms or display images.

The pattern input device 860 may receive analog-type sound, images, etc., and may include one or more of a microphone, a camera, etc.

The analog-digital converter 870 may convert analog data, provided by the pattern input device 860, to digital data, and may also analyze the digital data.

The neuromorphic device 880 may perform learning, recognition, and the like using data provided by the analog-digital converter 870, and may output data corresponding to recognized patterns. The neuromorphic device 880 may include one or more neuromorphic devices that include synapses of the embodiments described above. For example, the neuromorphic device 880 may include a substrate; a first electrode and a second electrode that are disposed over the substrate, the first and second electrodes extending in a first direction and being spaced apart from each other in a second direction, the first direction being perpendicular to a top surface of the substrate, the second direction being parallel to the top surface of the substrate; a stack structure disposed between the first electrode and the second electrode, the stack structure including a plurality of reactive metal layers which are alternately stacked with one or more insulating layers, wherein each of the reactive metal layers is capable of reacting with oxygen ions to form a dielectric oxide layer; an oxygen-containing layer disposed between the first electrode and the stack structure, the oxygen-containing layer including the oxygen ions; and an oxygen diffusion-retarding layer disposed between the stack structure and the oxygen-containing layer, the oxygen diffusion-retarding layer interfering with a movement of the oxygen ions from the oxygen-containing layer to the reactive metal layers, and wherein a thickness of the oxygen diffusion-retarding layer varies along the first direction. By using this configuration, the symmetry and linearity of the electrical conductivity of a synapse can be ensured. Accordingly, operating characteristics of the neuromorphic device 880 can be improved, and thus operating characteristics of the pattern recognition system 800 may also be improved.

The pattern recognition system 800 may further include other components required for properly performing its function(s). For example, the pattern recognition system 800 may further include one or more input devices such as a keyboard, a mouse, and the like, so as to receive various parameters and/or setting conditions for operations of the pattern recognition system 800.

According to the embodiments as described above, the symmetry and linearity of the electrical conductivity of the synapse may be enhanced, and thus the operating characteristics of the neuromorphic device may be improved.

While the present invention has been described with respect to the specific embodiments, it will be apparent to those skilled in the art that various changes and modifications may be made without departing from the spirit and scope of the invention as defined in the following claims.

What is claimed is:

1. A neuromorphic device comprising:
   a substrate;
   a first electrode and a second electrode that are disposed over the substrate, the first and second electrodes extending in a first direction and being spaced apart from each other in a second direction, the first direction being perpendicular to a top surface of the substrate, the second direction being parallel to the top surface of the substrate;
   a stack structure disposed between the first electrode and the second electrode, the stack structure including a plurality of reactive metal layers which are alternately stacked with one or more insulating layers, wherein each of the reactive metal layers is capable of reacting with oxygen ions to form a dielectric oxide layer;
   an oxygen-containing layer disposed between the first electrode and the stack structure, the oxygen-containing layer including the oxygen ions; and
   an oxygen diffusion-retarding layer disposed between the stack structure and the oxygen-containing layer, the oxygen diffusion-retarding layer interfering with a movement of the oxygen ions from the oxygen-containing layer to the reactive metal layers, and
   wherein a thickness of the oxygen diffusion-retarding layer varies along the first direction.

2. The neuromorphic device of claim 1, wherein the thickness of the oxygen diffusion-retarding layer increases from a top of the oxygen diffusion-retarding layer to a bottom of the oxygen diffusion-retarding layer.

3. The neuromorphic device of claim 2, wherein thicknesses of the plurality of reactive metal layers increase along a direction from a top of the stack structure to a bottom of the stack structure.

4. The neuromorphic device of claim 1, wherein the thickness of the oxygen diffusion-retarding layer decreases from a top of the oxygen diffusion-retarding layer to a bottom of the oxygen diffusion-retarding layer.

5. The neuromorphic device of claim 4, wherein thicknesses of the reactive metal layers decrease along a direction from a top of the stack structure to a bottom of the stack structure.

6. The neuromorphic device of claim 1, wherein the second electrode includes a plurality of second electrodes, which are spaced apart from each other, and
   wherein the stack structure includes a plurality of stack structures, which are spaced apart from each other, each of the plurality of stack structures corresponding to a respective one of the plurality of the second electrodes.

7. The neuromorphic device of claim 6, further comprising:
   an interlayer insulating layer disposed between two adjacent second electrodes and between two adjacent stack structures corresponding to the two adjacent second electrodes.

8. The neuromorphic device of claim 7, further comprising:
   a slit penetrating through the interlayer insulating layer and extending in a direction crossing a region between the two adjacent second electrodes and between the two adjacent stack structures, the slit extending from the first electrode.

9. The neuromorphic device of claim 8, further comprising:

a filling layer disposed in the slit, the filling layer including the same material as at least one of the oxygen-containing layer and the oxygen diffusion-retarding layer.

10. The neuromorphic device of claim 1, wherein thicknesses of the plurality of reactive metal layers are different from each other.

11. The neuromorphic device of claim 1, wherein the oxygen-containing layer is disposed against a side surface of the first electrode, the oxygen-containing layer encircling the first electrode.

12. The neuromorphic device of claim 11, wherein the oxygen diffusion-retarding layer is disposed against a side surface of the oxygen-containing layer, the oxygen diffusion-retarding layer encircling the oxygen-containing layer.

13. The neuromorphic device of claim 1, wherein a reset operation is performed when a reset voltage having a first polarity is applied through the first electrode and the second electrode, the reset operation including forming or thickening the dielectric oxide layer in at least one of the plurality of reactive metal layers at an interface with the oxygen diffusion-retarding layer, and
wherein a set operation is performed when a set voltage having a second polarity opposite to the first polarity is applied through the first electrode and the second electrode, the set operation including disappearing or thinning the dielectric oxide layer.

14. The neuromorphic device of claim 13, wherein the dielectric oxide layer is formed the fastest in a first reactive metal layer of the plurality of reactive metal layers, the first reactive metal layer being separated from the oxygen-containing layer by a thinnest region of the oxygen diffusion-retarding layer.

15. The neuromorphic device of claim 13, wherein thicknesses of the plurality of reactive metal layers are different from each other, and the dielectric oxide layer is formed the fastest in a first reactive metal layer of the plurality of reactive metal layers, the first reactive metal layer having the smallest thickness of the plurality of reactive metal layers.

16. The neuromorphic device of claim 13, wherein the dielectric oxide layer includes one or more dielectric oxide layers, and
wherein an electrical conductivity decreases as a number of the one or more dielectric oxide layers increases or a thickness of each the one or more dielectric oxide layers increases, and the electrical conductivity increases as the number of the one or more dielectric oxide layers decreases or the thickness of each of the one or more dielectric oxide layers decreases.

17. The neuromorphic device of claim 13, wherein the dielectric oxide layer includes one or more dielectric oxide layers, and
wherein, during the reset operation, a number of the one or more dielectric oxide layers increases or a thickness of each of the one or more dielectric oxide layers increases when a number of pulses of the reset voltage applied through the first electrode and the second electrode increases, and
wherein, during the set operation, the number of the one or more dielectric oxide layers decreases or a thickness of each of the one or more dielectric oxide layers decreases when a number of pulses of the set voltage applied through the first electrode and the second electrode increases.

18. The neuromorphic device of claim 17, wherein, during the reset operation, the pulses of the reset voltage have a constant width and magnitude, and
wherein, during the set operation, the pulses of the set voltage have a constant width and magnitude.

19. The neuromorphic device of claim 1, wherein the oxygen diffusion-retarding layer has a thickness that incompletely blocks the movement of the oxygen ions.

20. The neuromorphic device of claim 1, wherein the oxygen diffusion-retarding layer comprises a dielectric material, a semiconductor material, or a combination of the dielectric material and the semiconductor material.

* * * * *